United States Patent
Hata

(10) Patent No.: US 11,822,835 B2
(45) Date of Patent: Nov. 21, 2023

(54) STORAGE MEDIUM STORING COMPUTER PROGRAM, MANAGEMENT METHOD, AND MANAGEMENT APPARATUS

(71) Applicant: BROTHER KOGYO KABUSHIKI KAISHA, Nagoya (JP)

(72) Inventor: Megumi Hata, Nagakute (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/697,120

(22) Filed: Mar. 17, 2022

(65) Prior Publication Data

US 2022/0317948 A1 Oct. 6, 2022

(30) Foreign Application Priority Data

Apr. 1, 2021 (JP) ................................. 2021-062627

(51) Int. Cl.
| | | |
|---|---|---|
| G06F 3/12 | (2006.01) | |
| G06Q 30/0645 | (2023.01) | |
| H04N 1/00 | (2006.01) | |

(52) U.S. Cl.
CPC .......... G06F 3/1229 (2013.01); G06F 3/1273 (2013.01); G06F 3/1294 (2013.01); G06Q 30/0645 (2013.01); H04N 1/00344 (2013.01)

(58) Field of Classification Search
CPC . G06Q 30/0645; G06F 3/1294; G06F 3/1273; G06F 3/1229
See application file for complete search history.

(56) References Cited

U.S. PATENT DOCUMENTS

| | | | |
|---|---|---|---|
| 2002/0001475 A1 | 1/2002 | Kikuchi et al. | |
| 2018/0101775 A1* | 4/2018 | Fish | ...................... G06F 16/248 |
| 2021/0006079 A1* | 1/2021 | Weiderstrand | ....... G01R 31/392 |
| 2021/0091439 A1* | 3/2021 | Reeves | ............... H01M 50/269 |
| 2021/0232878 A1* | 7/2021 | Takaoka | ................ G06F 3/1219 |

FOREIGN PATENT DOCUMENTS

| | | |
|---|---|---|
| JP | 2002041691 A | 2/2002 |
| JP | 2002288389 A | 10/2002 |

* cited by examiner

*Primary Examiner* — John R Wallace
(74) *Attorney, Agent, or Firm* — Scully, Scott, Murphy & Presser, PC

(57) ABSTRACT

This specification discloses a non-transitory computer-readable storage medium storing a set of program instructions for a computer configured to manage rental printers. The computer includes a controller and a memory. The set of program instructions, when executed by the controller, causes the computer to perform: referring to history information indicating a printer use history of each of a plurality of users; and determining, for a part of a target printer to be rented to a target user, whether the part satisfies a replacement condition by using the history information and a scheduled rental period. The scheduled rental period is a rental period during which the target printer is scheduled to be rented. The replacement condition indicates that the part should be replaced before the target printer is rented to the target user.

13 Claims, 13 Drawing Sheets

| PART NUMBER PNB | PART NAME PNM | CUMULATIVE NUMBER OF PRINTED PAGES Np2 | CUMULATIVE NUMBER OF ERRORS Ne | CUMULATIVE NUMBER OF CLEANING OPERATIONS Nc | REPLACEMENT FLAG F |
|---|---|---|---|---|---|
| 1 | FIXING UNIT | 5000 | 0 | 1 | 0 |
| 2 | TRANSFER ROLLER | 35000→0 | 5→0 | 0 | 1→0 |
| 3 | SHEET FEED UNIT (TRAY 1) | 35000 | 3 | 1 | 0 |
| 4 | SHEET FEED UNIT (TRAY 2) | 35000→0 | 11→0 | 1→0 | 1→0 |
| 5 | BELT | 5000 | 4 | 0 | 0 |
| 6 | EXPOSURE DEVICE | 87000→0 | 0 | 12→0 | 1→0 |
| 7 | DEVELOPMENT ROLLER | 56000 | 0 | 0 | 0 |
| 8 | DRUM | 87000 | 1 | 0 | 0 |
| 9 | CLEANING ROLLER | 64000 | 0 | 0 | 0 |
|   |   | ↑ DP1 | ↑ DP2 | ↑ DP3 | ↑ DP4 |

VALUES AFTER LAST REPLACEMENT

| USER IDENTIFIER UID | RENTAL PRINTER IDENTIFIER PIDx | HISTORY DATA IDENTIFIER UDID |
|---|---|---|
| Ua | Pa | DB2Ua |
| Ub | - | DB2Ub |
| Uc | Pb | DB2Uc |
| Ud | Pc | DB2Ud |
| Ue | Pe | - |

| RENTAL PERIOD PP | NUMBER OF PRINTED PAGES NP |
|---|---|
| JANUARY 2018 | 500 |
| FEBRUARY 2018 | 500 |
| MARCH 2018 | 2000 |
| APRIL 2018 | 1000 |
| FEBRUARY 2019 | 300 |
| MARCH 2019 | 3000 |
| APRIL 2019 | 2000 |
| MAY 2019 | 500 |

| PART NUMBER PNB | PART NAME PNM | PRODUCT-LIFE NUMBER OF PAGES NsU |
|---|---|---|
| 1 | FIXING UNIT | 30000 |
| 2 | TRANSFER ROLLER | 40000 |
| 3 | SHEET FEED UNIT (TRAY 1) | 50000 |
| 4 | SHEET FEED UNIT (TRAY 2) | 50000 |
| 5 | BELT | 30000 |
| 6 | EXPOSURE DEVICE | 100000 |
| 7 | DEVELOPMENT ROLLER | 120000 |
| 8 | DRUM | 100000 |
| 9 | CLEANING ROLLER | 110000 |

| PRINTER IDENTIFIER PID | CUMULATIVE NUMBER OF PRINTED PAGES Np1 |
|---|---|
| Pa | 60000 |
| Pb | 50000 |
| Pc | 1000 |
| Pd | 500 |
| Pe | 0 |

FIG. 4

| PART NUMBER PNB | PART NAME PNM | CUMULATIVE NUMBER OF PRINTED PAGES Np2 | CUMULATIVE NUMBER OF ERRORS Ne | CUMULATIVE NUMBER OF CLEANING OPERATIONS Nc | REPLACEMENT FLAG F |
|---|---|---|---|---|---|
| 1 | FIXING UNIT | 5000 | 0 | 1 | 0 |
| 2 | TRANSFER ROLLER | 35000→0 | 5→0 | 0 | 1→0 |
| 3 | SHEET FEED UNIT (TRAY 1) | 35000 | 3 | 1 | 0 |
| 4 | SHEET FEED UNIT (TRAY 2) | 35000→0 | 11→0 | 1→0 | 1→0 |
| 5 | BELT | 5000 | 4 | 0 | 0 |
| 6 | EXPOSURE DEVICE | 87000→0 | 0 | 12→0 | 1→0 |
| 7 | DEVELOPMENT ROLLER | 56000 | 0 | 0 | 0 |
| 8 | DRUM | 87000 | 1 | 0 | 0 |
| 9 | CLEANING ROLLER | 64000 | 0 | 0 | 0 |

↑DP1　↑DP2　↑DP3　↑DP4

DB5Pa / DB5

VALUES AFTER LAST REPLACEMENT

FIG. 13A

| PART NUMBER PNB | PART NAME PNM | PRODUCT-LIFE NUMBER OF PAGES NsU |
|---|---|---|
| 1 | PRINT HEAD | 20000 |
| 2 | SHEET FEED ROLLER | 40000 |
| 3 | CARRIAGE | 50000 |

| PART NUMBER PNB | PART NAME PNM | CUMULATIVE NUMBER OF PRINTED PAGES Np2 | CUMULATIVE NUMBER OF ERRORS Ne | CUMULATIVE NUMBER OF CLEANING OPERATIONS Nc | REPLACEMENT FLAG F |
|---|---|---|---|---|---|
| 1 | PRINT HEAD | 5000 | 0 | 2 | 0 |
| 2 | SHEET FEED ROLLER | 35000→0 | 5→0 | 0 | 1→0 |
| 3 | CARRIAGE | 35000 | 0 | 0 | 0 |

DB5b / DB5bPa — VALUES AFTER LAST REPLACEMENT

STORAGE MEDIUM STORING COMPUTER PROGRAM, MANAGEMENT METHOD, AND MANAGEMENT APPARATUS

CROSS REFERENCE TO RELATED APPLICATIONS

This application claims priority from Japanese Patent Application No. 2021-062627 filed Apr. 1, 2021. The entire content of the priority application is incorporated herein by reference.

BACKGROUND

Printers such as copiers and multifunction peripherals are conventionally known. Also, maintenance services for copiers are known.

SUMMARY

According to one aspect, this specification discloses a non-transitory computer-readable storage medium storing a set of program instructions for a computer configured to manage rental printers. The computer includes a controller and a memory. The set of program instructions, when executed by the controller, causes the computer to perform: referring to history information indicating a printer use history of each of a plurality of users; and determining, for a part of a target printer to be rented to a target user, whether the part satisfies a replacement condition by using the history information and a scheduled rental period. The scheduled rental period is a rental period during which the target printer is scheduled to be rented. The replacement condition indicates that the part should be replaced before the target printer is rented to the target user.

According to another aspect, this specification also discloses a management method of managing rental printers. The management method includes: referring to history information indicating a printer use history of each of a plurality of users; and determining, for a part of a target printer to be rented to a target user, whether the part satisfies a replacement condition by using the history information and a scheduled rental period, the scheduled rental period being a rental period during which the target printer is scheduled to be rented, the replacement condition indicating that the part should be replaced before the target printer is rented to the target user.

According to still another aspect, this specification also discloses a management apparatus configured to manage rental printers. The management apparatus includes a controller and a memory. The memory stores a set of program instructions, when executed by the controller, causing the management apparatus to perform: referring to history information indicating a printer use history of each of a plurality of users; and determining, for a part of a target printer to be rented to a target user, whether the part satisfies a replacement condition by using the history information and a scheduled rental period. The scheduled rental period is a rental period during which the target printer is scheduled to be rented. The replacement condition indicates that the part should be replaced before the target printer is rented to the target user.

With this configuration, for a part(s) included in the target printer, an appropriate determination is performed as to whether the part satisfies a replacement condition.

The techniques disclosed in this specification may be implemented in various modes, such as a management method, a management apparatus, a computer program for realizing the functionality of the method or the apparatus, a storage medium storing the computer program (for example, a non-transitory computer readable medium), and so on.

BRIEF DESCRIPTION OF THE DRAWINGS

Embodiments in accordance with this disclosure will be described in detail with reference to the following figures wherein:

FIGS. 3A to 3D are explanatory diagrams showing an example of management data;

FIG. 4 is an explanatory diagram showing an example of management data;

FIG. 13A shows an example of third data DB3$b$, and FIG. 13B shows an example of fifth data DB5$b$.

DETAILED DESCRIPTION

For example, in response to detecting a failure by a failure diagnosis function, a copier transmits the failure data to a management server. The management server transmits repair details, the names of necessary parts, and their quantities to the serviceman's mobile phone.

In recent years, a printer rental service has been provided. In the rental service, printers are repeatedly rented and returned. During the rental period, a part (component) included in the printer may have a malfunction. In this case, the user may have to purchase and replace the part by the user himself/herself or request for repair to the administrator, which may be a burden for the user. If parts are preliminarily replaced before the printer is rented, malfunctions during the rental period are suppressed. However, there is room for improvement in determining whether to replace a part.

In view of the foregoing, an aspect of an object of this specification is to disclose a technique for determining whether a part should be replaced before a printer is rented.

A. First Embodiment

Figure 1:
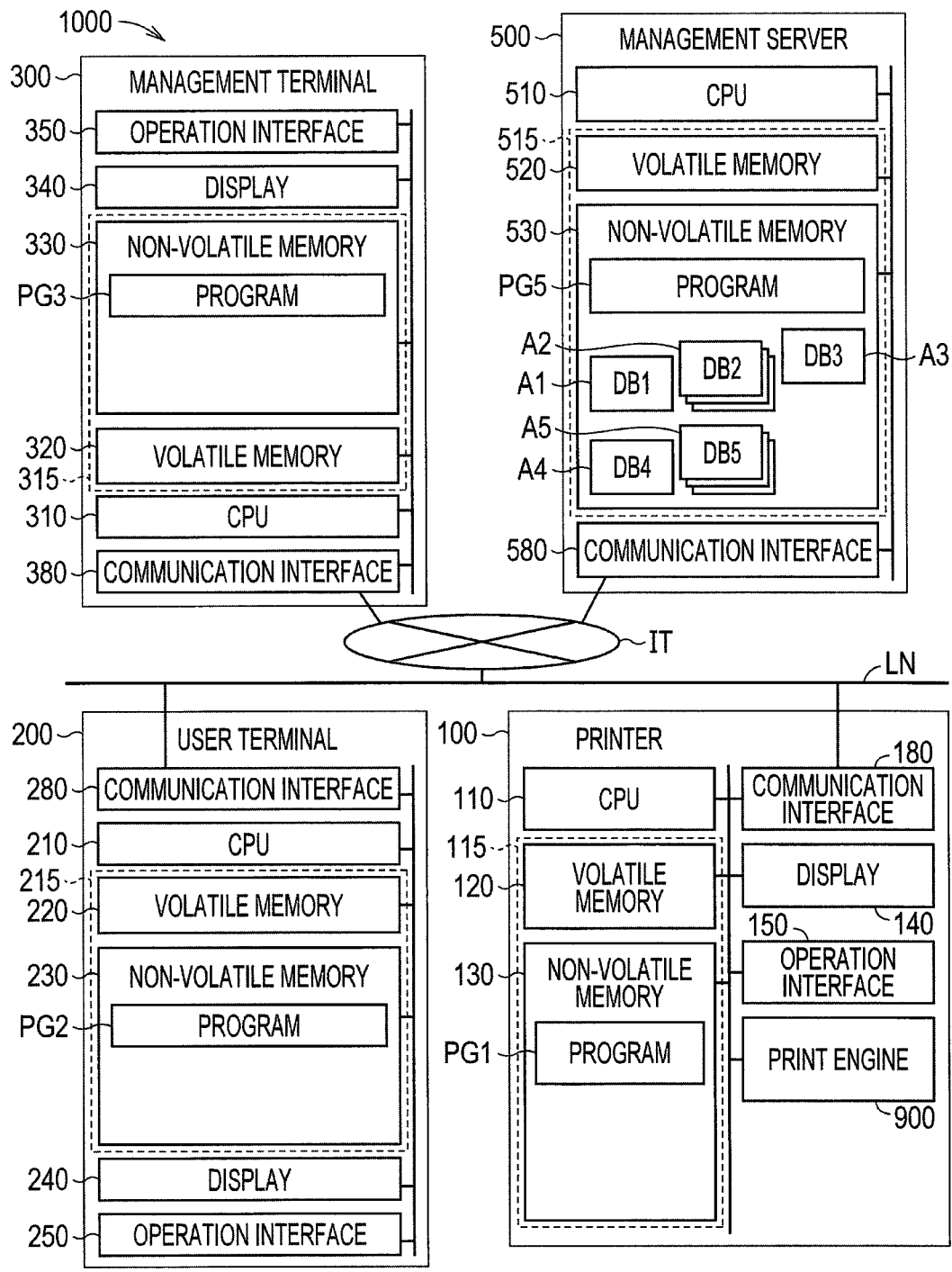
FIG. 1 is a block diagram showing a configuration of a system.

A-1. Configuration of System 1000:

As shown in FIG. 1, a system 1000 includes a printer 100, a user terminal 200, a management terminal 300, and a management server 500. The management terminal 300 and the management server 500 are connected to Internet IT. The printer 100 and the user terminal 200 are connected to a local area network LN. The local area network LN is connected to the Internet IT. The management terminal 300 communicates with the management server 500 via the Internet IT. The printer 100 and the user terminal 200 communicate with the management server 500 via the local area network LN and the Internet IT.

The printer 100 includes a CPU 110, a memory 115, a display 140, an operation interface 150, a print engine 900, and a communication interface 180. These elements are connected to one another via a bus. The memory 115 includes a volatile memory 120 and a non-volatile memory 130. The printer 100 is an example of a rental printer.

The display 140 is a device for displaying an image, and is, for example, a liquid crystal display. The operation interface 150 is a device that receives an operation by a user, and includes, for example, a touch panel arranged on the display 140. The user inputs various instructions to the printer 100 by operating the operation interface 150. The communication interface 180 is an interface for communicating with other devices (for example, a wired LAN interface, an IEEE 802.11 wireless interface). In this embodiment, the communication interface 180 is connected to the local area network LN. The print engine 900 is a device that prints an image on a sheet (an example of a print medium) by using a print material by a particular method. The details of the print engine 900 will be described later.

The CPU 110 is an example of a data processing device. The volatile memory 120 is a DRAM, for example. The non-volatile memory 130 is a flash memory, for example. The non-volatile memory 130 stores a program PG1. The CPU 110 executes various processes by executing the program PG1. The CPU 110 temporarily stores various intermediate data used for executing the program PG1 in the memory 115 (for example, the volatile memory 120 or the non-volatile memory 130). Details of the processing executed by the CPU 110 will be described later. In this embodiment, the program PG1 is stored in advance in the non-volatile memory 130 as firmware by the manufacturer of the printer 100.

In this embodiment, a plurality of printers is used for rental (rental printers). Hereinafter, it is assumed that a plurality of rental printers has the same configuration as the printer 100. Hereinafter, when it is not necessary to distinguish individual printers, the printer is also referred to as printer 100.

The management server 500 executes a process of managing a plurality of rental printers 100. The management server 500 includes a CPU 510, a memory 515, and a communication interface 580. These elements are connected to each other via a bus. The memory 515 includes a volatile memory 520 and a non-volatile memory 530.

The communication interface 580 is an interface for communicating with other devices (for example, a wired LAN interface, an IEEE 802.11 wireless interface). In this embodiment, the communication interface 580 is connected to the Internet IT.

The CPU 510 is an example of a data processing device. The volatile memory 520 is a DRAM, for example. The non-volatile memory 530 is a flash memory, for example. The non-volatile memory 530 stores a program PG5 and management data DB1-DB5. Of the storage areas of the non-volatile memory 530, the areas that store the management data DB1-DB5 are referred to as storage areas A1-A5, respectively. The CPU 510 executes a process for managing the rental printers by executing the program PG5. The CPU 510 temporarily stores various intermediate data used for executing the program PG5 in the memory 515 (for example, the volatile memory 520 or the non-volatile memory 530). The details of the process executed by the CPU 510 and the management data DB1-DB5 will be described later.

The management terminal 300 is a terminal device of an operator who performs maintenance of the plurality of printers (for example, a smartphone, a tablet computer, and so on). The operator operates the management terminal 300 to control various processes provided by the management server 500. The management terminal 300 includes a CPU 310, a memory 315, a display 340, an operation interface 350, and a communication interface 380. These elements are connected to one another via a bus. The memory 315 includes a volatile memory 320 and a non-volatile memory 330.

The display 340 is a device for displaying an image, and is, for example, a liquid crystal display. The operation interface 350 is a device that receives an operation by the user, and includes, for example, a touch panel arranged on the display 340. The user operates the operation interface 350 to input various instructions to the management terminal 300.

The communication interface 380 is an interface for communicating with other devices (for example, a wired LAN interface, an IEEE 802.11 wireless interface). In this embodiment, the communication interface 380 is connected to the Internet IT.

The CPU 310 is an example of a data processing device. The volatile memory 320 is a DRAM, for example. The non-volatile memory 330 is a flash memory, for example. The non-volatile memory 330 stores a program PG3. By executing the program PG3, the CPU 310 executes functions as a management application that controls the processing provided by the management server 500 (details will be described later).

The CPU 310 temporarily stores various intermediate data used for executing the program PG3 in the memory (for example, the volatile memory 320 or the non-volatile memory 330). In this embodiment, the program PG3 of the management application is provided by a server (not shown). Alternatively, the program PG3 may be provided by a portable storage medium such as a memory card.

The user terminal 200 is a terminal device of a user who uses the printer 100 (for example, a smartphone, a tablet computer, and so on). The user operates the user terminal 200 to cause the printer 100 to print an image. In this embodiment, the hardware configuration of the user terminal 200 is the same as the hardware configuration of the management terminal 300. The user terminal 200 includes a CPU 210, a memory 215, a display 240, an operation interface 250, and a communication interface 280. These elements are connected to one another via a bus. The memory 215 includes a volatile memory 220 and a non-volatile memory 230. The configurations of the elements 210, 220, 230, 240, 250, 280 of the user terminal 200 are the same as the configurations of the elements 310, 320, 330, 340, 350, 380 of the management terminal 300, respectively. In this embodiment, the communication interface 380 is connected to the local area network LN. The non-volatile memory 230 stores a program PG2. The CPU 210 executes a function as a printing application for causing the printer 100 to print an image by executing the program PG2. In this embodiment, the program PG2 of the print application is provided by a server (not shown). Alternatively, the program PG2 may be provided by a portable storage medium such as a memory card.

Figure 2:
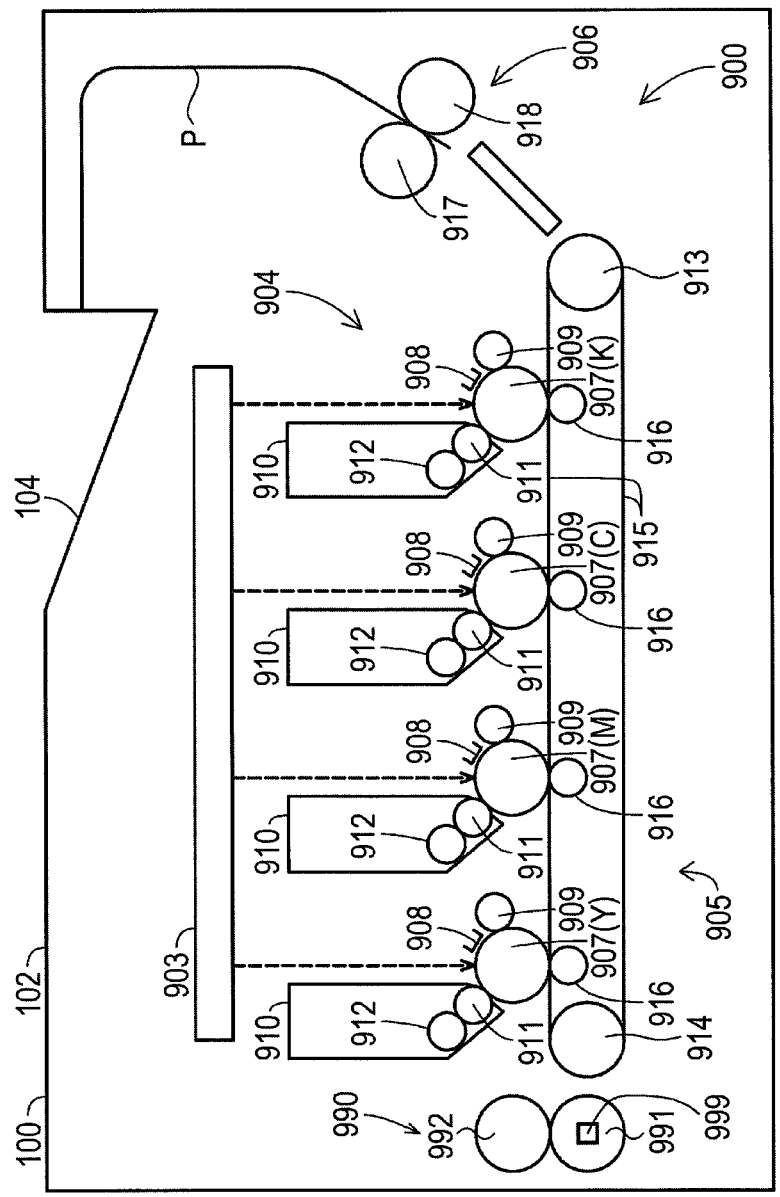
FIG. 2 is a schematic diagram of a print engine of a printer.

A-2. Configuration of Print Engine 900:

As shown in FIG. 2, in this embodiment, a print engine 900 (print execution unit) is a laser type color printing device. The printer 100 includes a body 102 and the print engine 900 accommodated in the body 102. The print engine 900 includes a scanner unit 903, a process unit 904, a transfer unit 905, a fixing unit 906, and a sheet feed unit 990.

As shown by the broken line, the scanner unit 903 irradiates a photosensitive drum 907 of the process unit 904 with a laser beam based on image data to expose the photosensitive drum 907. Hereinafter, the scanner unit 903 is also referred to as an exposure device 903.

The process unit 904 includes four sets of the photosensitive drum 907, a scorotron type charger 908, a drum cleaning roller 909, and a development cartridge 910. The four sets correspond to Yellow Y, Magenta M, Cyan C, and Black K, respectively, and are arranged side by side in this order from the front to the rear (from the left side to the right side in FIG. 2). The development cartridge 910 contains toner of the corresponding color, and includes a development roller 911 and a supply roller 912.

The transfer unit 905 includes a drive roller 913, a follow roller 914, a conveyance belt 915, and four transfer rollers 916. The conveyance belt 915 is wound around the drive roller 913 and the follow roller 914 such that the upper portion thereof contacts each of the four photosensitive drums 907. The four transfer rollers 916 correspond to the four photosensitive drums 907, respectively. The transfer rollers 916 are arranged below the corresponding photosensitive drums 907 with the upper portion of the conveyance belt 915 interposed therebetween.

The sheet feed unit 990 is arranged at the front of the transfer unit 905 and includes a drive roller 991, a follow roller 992 in contact with the drive roller 991, and a rotation sensor 999 that detects the rotation of the drive roller 991. The sheet feed unit 990 supplies sheets contained in a sheet feed tray (not shown) to the process unit 904. Although not shown, in this embodiment, the printer 100 includes two sheet feed trays. The sheet feed unit 990 is provided for each sheet feed tray. In FIG. 2, one sheet feed unit 990 is shown as a representative.

The fixing unit 906 is arranged at the rear of the transfer unit 905, and includes a heating roller 917 and a pressure roller 918 in contact with the heating roller 917.

When the print engine 900 performs printing, the scorotron type charger 908 uniformly charges the surface of the photosensitive drum 907. The scanner unit 903 exposes the surface of the photosensitive drum 907. Thus, an electrostatic latent image based on image data is formed on the surface of the photosensitive drum 907. The supply roller 912 supplies toner in the development cartridge 910 to the development roller 911. The development roller 911 supplies toner to the electrostatic latent image on the surface of the photosensitive drum 907. Thus, the toner image is borne on the surface of the photosensitive drum 907. The sheet feed unit 990 supplies a sheet P from the sheet feed tray (not shown) to a position between the frontmost photosensitive drum 907 (in this embodiment, the photosensitive drum 907 of Yellow Y) and the conveyance belt 915. The sheet P is conveyed from the front to the rear by the conveyor belt 915. The toner image on the photosensitive drum 907 is transferred to the sheet P when the sheet P is sandwiched between the photosensitive drum 907 and the transfer roller 916. After transferring the four-color toner images, the sheet P passes between the heating roller 917 and the pressure roller 918. The toner image on the sheet P is thermally-fixed to the sheet P by heating and pressurizing by the heating roller 917 and the pressure roller 918. After that, the sheet P is discharged to a sheet discharge tray 104. After the transfer of the toner images, the toner adhering to the photosensitive drums 907 is collected by the corresponding drum cleaning rollers 909.

FIG. 3A shows an example of the first management data DB1 (also referred to simply as first data DB1). The first data DB1 indicates the correspondence between a user identifier UID, a rental printer identifier PIDx, and a history data identifier UDID. The user identifier UID is information for identification of a user. The rental printer identifier PIDx is information for identification of a printer rented to a user. If a user does not rent a printer at present, the rental printer identifier PIDx is blank. The history data identifier UDID is an identifier of individual user data indicating a user's printer use history. If a user has never performed printing using a printer, the history data identifier UDID is blank.

FIG. 3B shows an example of the second management data DB2 (also referred to simply as second data DB2). The second data DB2 is data indicating printer use history. The second data DB2 indicates the correspondence between a rental period PP and a number of printed pages NP. In the present embodiment, the rental period PP is represented by a combination of year and month.

The second data DB2 contains a plurality of individual user data corresponding to a plurality of users. FIG. 3B shows an example of individual user data DB2Ua contained in the second data DB2 and associated with a first user Ua. The individual user data is a portion of the second data DB2 indicating a use history of one user. The individual user data is assigned a unique identifier. An identifier of the individual user data is associated with the history data identifier UDID (FIG. 3A). Hereinafter, the second data DB2 will also be referred to as history data DB2. The individual user data will also be referred to as user history data. The history information indicated by the history data DB2 will also be referred to as history information DB2i.

FIG. 3C shows an example of the third management data DB3 (also referred to simply as third data DB3). The third data DB3 indicates the correspondence between a part number PNB, a part name PNM, and a product-life number of pages NsU. The part number PNB is information for identification of a part of the printer 100. In the present embodiment, the part number PNB is an integer starting from 1. The part name PNM is the name of a part. The product-life number of pages NsU is an indication of the life of a part and represented by the number of printed pages. When the number of pages printed after use of the part is started exceeds the product-life number of pages NsU, replacement of the part is desired. The product-life number of pages NsU (that is, the third data DB3) of each part is set in advance by the manufacturer of the printer 100. A plurality of parts that may be replaced before the printer 100 is rented are registered (stored) in advance in the third data DB3.

FIG. 3D shows an example of the fourth management data DB4 (also referred to simply as fourth data DB4). The fourth data DB4 indicates the correspondence between a printer identifier PID and a first cumulative number of printed pages Np1. The printer identifier PID is information for identification of a printer. This printer identifier PID is set in the first data DB1 (FIG. 3A) as the rental printer identifier PIDx. The first cumulative number of printed pages Np1 is the cumulative value of the number of pages printed using a printer (hereinafter, the first cumulative number of printed pages Np1 will also be referred to as printer cumulative value Np1). The printer cumulative value Np1 is counted without being reset irrespective of whether a part of a printer was replaced.

FIG. 4 shows an example of the fifth management data DB5 (also referred to simply as fifth data DB5). The fifth data DB5 is data indicating the used amount of each of a plurality of parts of a printer. The fifth data DB5 indicates the correspondence between the part number PNB, the part name PNM, a second cumulative number of printed pages Np2, a cumulative number of errors Ne, a cumulative number of cleaning operations Nc, and a replacement flag F.

The fifth data DB5 contains a plurality of individual printer data corresponding to a plurality of printers. FIG. 4 shows an example of individual printer data DB5 Pa contained in the fifth data DB5 and associated with a first printer Pa. The individual printer data is a portion of the fifth data DB5 indicating the information for one printer.

A plurality of parts which are the same as the plurality of parts registered in the third data DB3 (FIG. 3C) are registered in the individual printer data DB5 Pa (more generally, the fifth data DB5). The second cumulative number of printed pages Np2 is the cumulative value of the number of pages printed using a corresponding part (hereinafter, the second cumulative number of printed pages Np2 will also be referred to as part cumulative value Np2). The cumulative number of errors Ne is the cumulative number of errors related to a corresponding part. The cumulative number of cleaning operations Nc is the cumulative number of cleaning operations related to a corresponding part. The replacement flag F indicates whether a replacement condition indicating that a part should be replaced is satisfied. The replacement flag F="1" indicates that the replacement condition is satisfied and the replacement flag F="0" indicates that the replacement condition is not satisfied. A rightward arrow and a numerical value on the right side of the arrow in FIG. 4 indicate a change in the value caused by the replacement of a part described later. Np2, Ne, Nc, and F are reset to zero in response to the replacement of a corresponding part. In other words, Np2, Ne, Nc, and F indicate the value after the last replacement of a part.

As shown in FIG. 4, the fifth data DB5 contains a plurality of portions DP1 to DP4. The part used amount data DP1 indicates the correspondence between PNB and Np2. The part error data DP2 indicates the correspondence between PNB and Ne. The part cleaning data DP3 indicates the correspondence between PNB and Nc. The part replacement data DP4 indicates the correspondence between PNB and F.

Figure 5:
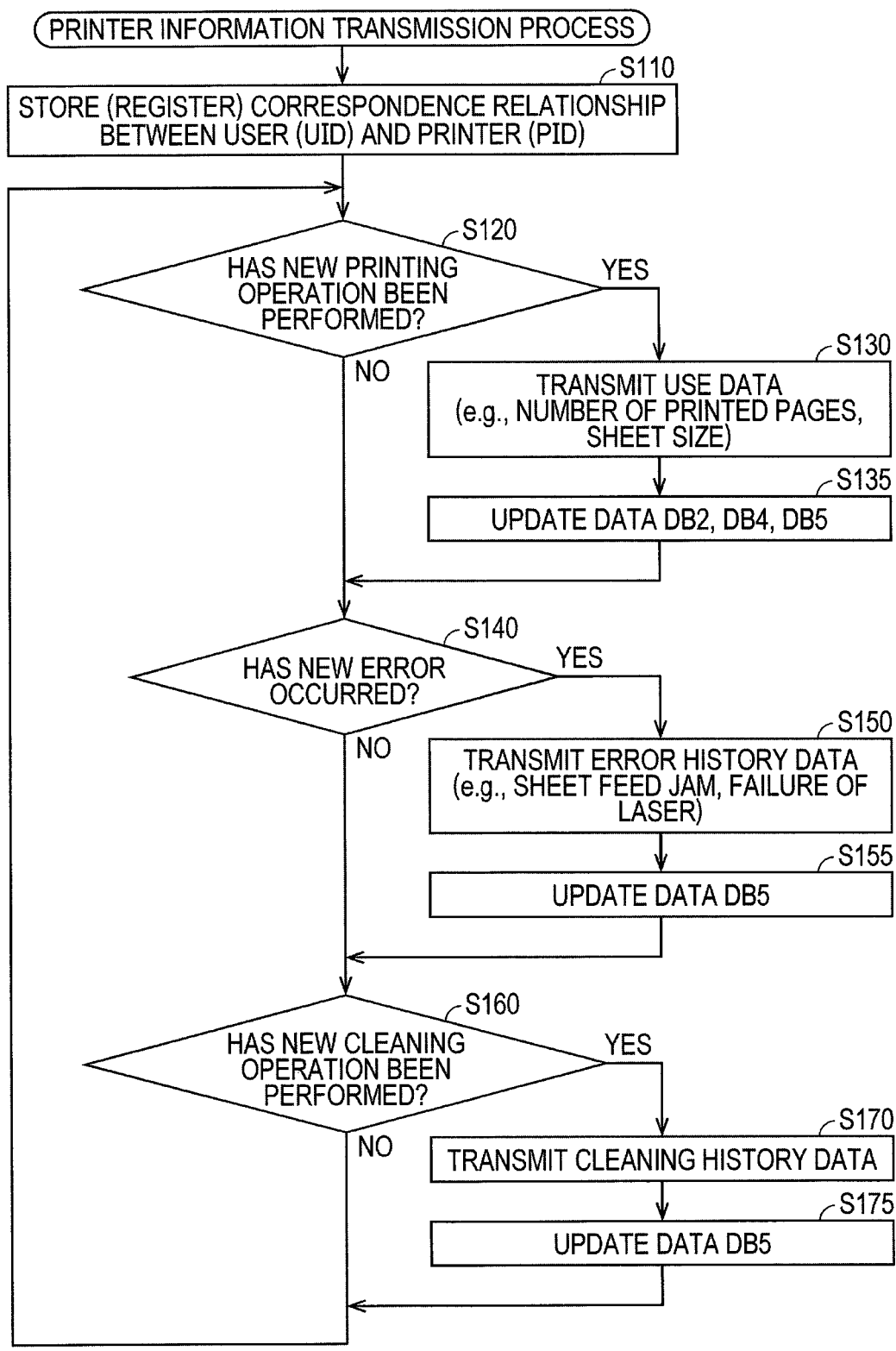
FIG. 5 is a flowchart showing an example of printer information transmission process.

A-3. Printer Information Transmission Process:

A printer information transmission process of FIG. 5 is the process to register a use history of the printer 100 in the management server 500. After the printer 100 is rented to a user, the CPU 110 of the printer 100 starts the processing of FIG. 5 when the user starts up the printer 100.

In S110, the CPU 110 performs user registration processing. The user who rented the printer 100 enters his/her user identifier UID (also referred to as focused user identifier UID) into the printer 100 by operating the operation interface 150. The CPU 110 transmits registration data indicating a focused printer identifier PID, which is the printer identifier PID of the printer 100, and the focused user identifier UID to the management server 500. The CPU 510 of the management server 500 updates the first data DB1 (FIG. 3A) using the registration data from the printer 100. If the focused user identifier UID is already registered in the first data DB1, the CPU 510 sets the rental printer identifier PIDx associated with the focused user identifier UID to the focused printer identifier PID. If the focused user identifier UID is not registered in the first data DB1, that is, if the user is a new user, the CPU 510 adds the correspondence between the focused user identifier UID and the focused printer identifier PID to the first data DB1.

User data indicating the focused user identifier UID may be stored in the memory 115 (for example, the non-volatile memory 130) of the printer 100 before the printer 100 is delivered to the user. In S110, the CPU 110 of the printer 100 may obtain the focused user identifier UID by referring to the user data. The CPU 110 of the printer 100 may perform authentication by using a password or secret key to allow the user to use the printer 100.

After S110, the CPU 110 of the printer 100 repeatedly performs determination processes of S120, S140, and S160 described later (for example, S120, S140, and S160 are performed a plurality of times per day).

In S120, the CPU 110 determines whether the printer 100 has performed printing after the previous S120 (that is, the previous execution of S120). If the determination result obtained in S120 is Yes, in S130, the CPU 110 transmits use data indicating information about a use history of the printer 100 to the management server 500. In the present embodiment, the use data indicates the focused user identifier UID, the focused printer identifier PID, the number of printed pages, and the month and year of printing. The number of printed pages is the number of pages printed after the previous S120. The use data may further indicate various information about printing such as a sheet size used in printing.

S135 is performed by the management server 500 in response to reception of the use data. The CPU 510 of the management server 500 updates the second data DB2 (FIG. 3B), the fourth data DB4 (FIG. 3D), and the fifth data DB5 (FIG. 4) using the use data. Specific processing is as follows.

The CPU 510 updates the individual user data contained in the history data DB2 (FIG. 3B) and corresponding to the focused user identifier UID indicated by the use data. Specifically, the CPU 510 adds the number of printed pages indicated by the use data to the number of printed pages NP associated with the rental period PP containing the month and year of printing indicated by the use data. The CPU 510 searches for the individual user data corresponding to the focused user identifier UID by referring to the first data DB1 (FIG. 3A).

The CPU 510 refers to the fourth data DB4 (FIG. 3D) and adds the number of printed pages indicated by the use data to the first cumulative number of printed pages Np1 associated with the focused printer identifier PID indicated by the use data.

The CPU 510 updates the individual printer data contained in the fifth data DB5 (FIG. 4) and corresponding to the focused printer identifier PID indicated by the use data. Specifically, the CPU 510 adds the number of printed pages indicated by the use data to the part cumulative values Np2 of all the parts.

If the user of the focused user identifier UID has never performed printing before, the history data DB2 does not contain individual user data corresponding to the focused user identifier UID. In this case, the CPU 510 of the management server 500 generates new individual user data associated with the focused user identifier UID and adds the individual user data to the second data DB2. The CPU 510 then sets the history data identifier UDID associated with the focused user identifier UID of the first data DB1 (FIG. 3A) to an identifier of the generated individual user data.

After S130 (FIG. 5), the CPU 110 of the printer 100 proceeds to S140. This transition may be performed before the completion of S135 or after the completion of S135. If the printer 100 has not performed printing after the previous S120 (S120: No), the CPU 110 proceeds to S140 without performing S130.

In S140, the CPU 110 determines whether an error has occurred in the printer 100 after the previous S140. The printer 100 is configured to sense various errors. For example, the rotation sensor 999 of the sheet feed unit 990 (FIG. 2) includes an encoder and senses the rotation of the drive roller 991. If the rotation sensor 999 senses that the drive roller 991 has stopped rotating during sheet feeding, the sensed halt indicates a paper jam error. Though not shown in the drawing, the printer 100 includes sensing devices for sensing various errors (for example, a laser failure) in addition to a paper jam.

If the determination result obtained in S140 is Yes, in S150, the CPU 110 transmits error history data indicating information about errors to the management server 500. In the present embodiment, the error history data indicates the focused printer identifier PID, the number of errors that occurred after the previous S140, and the classification of each error. The classification of an error is determined from a plurality of predetermined classifications in accordance with the details of the error that occurred. The plurality of error classifications includes various classifications such as a paper jam and a laser failure.

S155 is performed by the management server 500 in response to reception of the error history data. The CPU 510 of the management server 500 updates the individual printer data contained in the fifth data DB5 (FIG. 4) and corresponding to the focused printer identifier PID indicated by the error history data. Specifically, for each error, the CPU 510 adds "1" to the cumulative number of errors Ne of the part number PNB associated with the classification of the error. The correspondence between the classification of an error and the part number PNB is determined in advance. For example, the sheet feed unit 990 is associated with a paper jam and the exposure device 903 is associated with a laser failure. Two or more part numbers PNB may be associated with the classification of one error.

After S150 (FIG. 5), the CPU 110 of the printer 100 proceeds to S160. This transition may be performed before the completion of S155 or after the completion of S155. If no error has occurred after the previous S140 (S140: No), the CPU 110 proceeds to S160 without performing S150.

In S160, the CPU 110 determines whether cleaning has been performed after the previous S160. Cleaning is processing to remove a foreign substance (for example, a printing material such as toner) adhering to a part of the printer 100. The printer 100 automatically performs cleaning. For example, the CPU 110 performs cleaning of the sheet feed unit 990 and the fixing unit 906 by conveying a sheet P without performing printing. Further, the user may perform cleaning. For example, the user performs cleaning of the exposure device 903 by wiping the exposure device 903 with a cloth. In the present embodiment, cleaning is performed in accordance with an instruction provided by the user. For example, the user provides an instruction to the printer 100 to perform cleaning when the user finds a toner stain on a printed material. The user performs cleaning of a part such as the exposure device 903 by taking the printer 100 apart. Alternatively, the CPU 110 may automatically start cleaning. For example, the CPU 110 may regularly perform cleaning (for example, conveyance of the sheet P without printing). When the user performs cleaning of a part, the user enters information indicating the classification of a cleaning operation by operating the operation interface 150. The classification of a cleaning operation is determined from a plurality of predetermined classifications in accordance with the details of the cleaning operation. The plurality of cleaning classifications includes various classifications such as conveyance of the sheet P and wiping of the exposure device 903.

If the determination result obtained in S160 is Yes, in S170, the CPU 110 transmits cleaning history data indicating information about cleaning to the management server 500. In the present embodiment, the cleaning history data indicates the focused printer identifier PID, the number of cleaning operations performed after the previous S160, and the classification of each cleaning operation.

S175 is performed by the management server 500 in response to reception of the cleaning history data. The CPU 510 of the management server 500 updates the individual printer data contained in the fifth data DB5 (FIG. 4) and corresponding to the focused printer identifier PID indicated by the cleaning history data. Specifically, for each cleaning operation, the CPU 510 adds "1" to the cumulative number of cleaning operations Nc of the part number PNB associated with the classification of the cleaning operation. The correspondence between the classification of a cleaning operation and the part number PNB is determined in advance. For example, the sheet feed unit 990 and the fixing unit 906 are associated with conveyance of the sheet P, and the exposure device 903 is associated with wiping of the exposure device 903.

After S170 (FIG. 5), the CPU 110 of the printer 100 returns to S120. This transition may be performed before the completion of S175 or after the completion of S175. If cleaning has not been performed after the previous S160 (S160: No), the CPU 110 returns to S120 without performing S170. The CPU 110 then repeats the above-described processes. By doing so, the CPU 510 of the management server 500 updates the data DB1, DB2, DB4, and DB5 so as to indicate the latest information.

Figure 6:
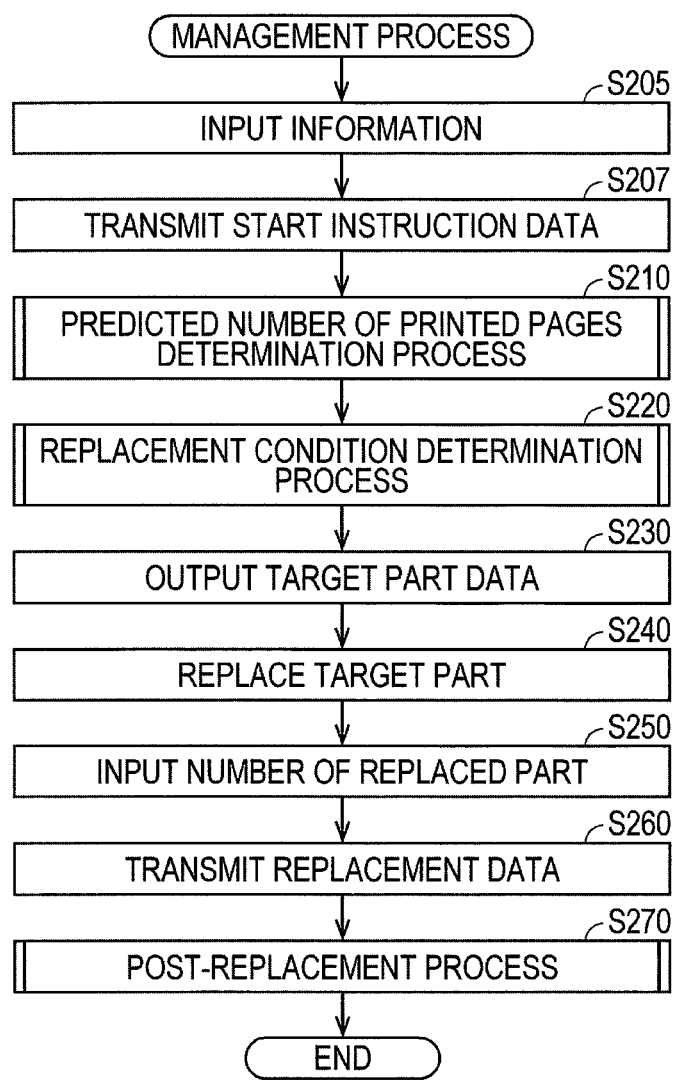
FIG. 6 is a flowchart showing an example of a management process.

A-4. Management Process:

A management process of FIG. 6 is processing for performing maintenance of a target printer, which is a printer to be rented to a user, before it is rented. As will be described later, the target printer is selected from among a plurality of rentable printers. The plurality of rentable printers is not limited to new printers and include printers that were rented and returned. When the target printer is a returned printer, sometimes each of a plurality of parts of the target printer is worn out by the past use. In the processing of FIG. 6, the management server 500 extracts a part that may cause a malfunction during a new rental period from the plurality of parts included in the target printer. The operator replaces the extracted part with a new part and does not replace the part that was not extracted.

In S205, the operator starts a management application by operating the operation interface 350 of the management terminal 300 (FIG. 1). Furthermore, the operator enters a target user identifier and a scheduled rental period into the management application by operating the operation interface 350. The target user identifier is a user identifier UID (also referred to as a target user identifier UID) of a target user, that is, a user who rents a printer. The scheduled rental period is a rental period during which the target printer is scheduled to be rented. The scheduled rental period may be a rental period requested by the target user. In the present embodiment, the rental period is a continuous period and represented by a combination of year and month. The rental period may be a period of two months or longer, such as "from January to June 2021". In S207, the CPU 310 transmits start instruction data indicating the target user identifier UID and the scheduled rental period to the management server 500.

In S210, the CPU 510 of the management server 500 performs a predicted-number-of-printed-pages determination process in response to the start instruction data. The predicted number of printed pages is the predicted value of the number of pages to be printed by the target user during the scheduled rental period.

In S310, the CPU 510 of the management server 500 refers to the start instruction data and acquires the target user identifier UID and the scheduled rental period. In S330, the CPU 510 initializes a focused month to the first month of the scheduled rental period and initializes the candidate number of pages to zero.

In S340, the CPU 510 refers to the first data DB1 (FIG. 3A) and searches the history data DB2 (FIG. 3B) for user history data (for example, user history data DB2Ua) associated with the target user identifier UID. In S345, the CPU 510 determines whether the user history data associated with the target user identifier UID has been detected.

A situation in which the data of detection target is not detected indicates that the past use history of the target user identifier UID is not detected. In this case (S345: No), in S350, the CPU 510 refers to the history data DB2 and acquires the numbers of printed pages NP printed in the focused month by other users different from the user of the target user identifier UID. In S355, the CPU 510 determines the number of additional pages to be the average value of the numbers of printed pages NP printed in the focused month by the other users. For example, when the focused month is February, the CPU 510 refers to the user history data of all the other users in the history data DB2 and calculates the average value of the numbers of printed pages NP printed in February by all the other users. After S355, the CPU 510 proceeds to S390 of FIG. 8.

If user history data associated with the target user identifier UID is detected (S345: Yes), in S360, the CPU 510 refers to the user history data of the target user identifier UID in the history data DB2 (FIG. 3B) and searches for a use history (specifically, the number of printed pages NP) in the focused month of the past year. In S365, the CPU 510 determines whether the use history of the target user identifier UID in the focused month of the past year has been detected. If the data of detection target is detected (S365: Yes), in S370, the CPU 510 refers to the history data DB2 and acquires the number of printed pages NP, which were printed in the focused month of the past year, of the target user identifier UID. In S375, the CPU 510 determines the number of additional pages to be the average value of the numbers of printed pages NP, which were printed in the focused month of the past years, of the target user identifier UID. After S375, the CPU 510 proceeds to S390 of FIG. 8.

If a use history of the target user identifier UID in the focused month of the past year is not detected (S365: No), in S380, the CPU 510 refers to the history data DB2 (FIG. 3B) and acquires the numbers of printed pages NP, which were printed in the past entire period, of the target user identifier UID. In S385, the CPU 510 determines the number of additional pages to be the average value of the numbers of printed pages NP, which were printed in the past entire period, of the target user identifier UID. After S385, the CPU 510 proceeds to S390 of FIG. 8.

In S390 (FIG. 8), the CPU 510 updates the candidate number of pages by adding the number of additional pages to the candidate number of pages. The number of additional pages is determined in one of S355, S375, and S385 of FIG. 7. In S400, the CPU 510 updates the focused month by adding "1" to the focused month. In S410, the CPU 510 determines whether the updated focused month is within the scheduled rental period. If the focused month is within the scheduled rental period (S410: Yes), the CPU 510 returns to S340 of FIG. 7 and performs the processing for the new focused month. If the updated focused month is not within the scheduled rental period (S410: No), that is, the processing has been performed for all the months in the scheduled rental period, the CPU 510 proceeds to S420. At this stage, the candidate number of pages indicates the sum of the numbers of additional pages of all the months in the scheduled rental period.

In S420, the CPU 510 determines whether the candidate number of pages is smaller than a reference number of pages. The reference number of pages gives an indication of the minimum number of pages that are printable without a malfunction. In the present embodiment, the reference number of pages is set in advance (for example, 1000 pages). If the candidate number of pages is smaller than the reference number of pages (S420: Yes), in S430, the CPU 510 determines the predicted number of printed pages to be the reference number of pages, and ends the processing of FIGS. 7 and 8 (that is, S210 of FIG. 6). If the candidate number of pages is larger than or equal to the reference number of pages (S420: No), in S440, the CPU 510 determines the predicted number of printed pages to be the candidate number of pages, and ends the processing of FIGS. 7 and 8 (that is, S210 of FIG. 6).

Figure 7:
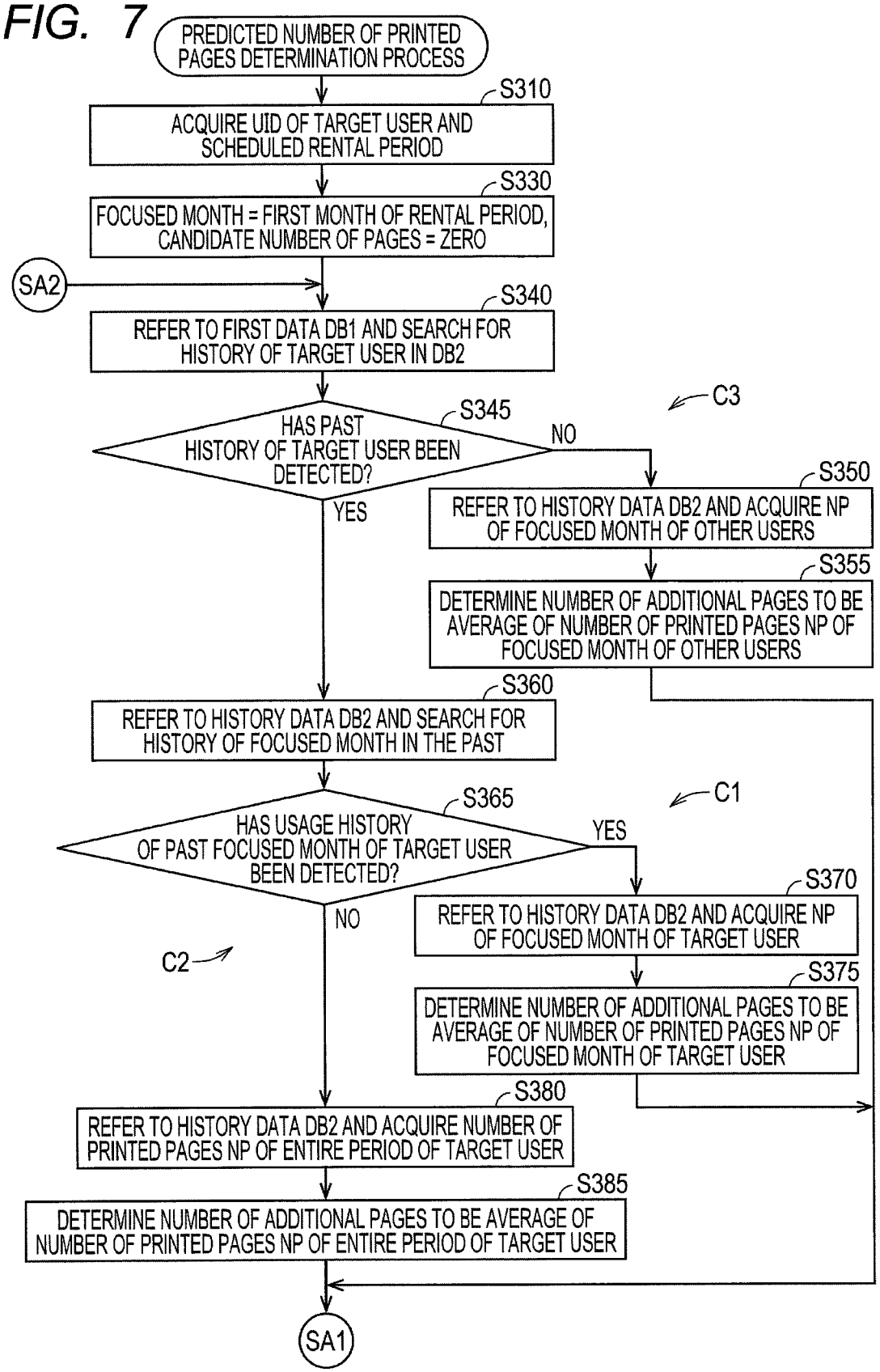
FIG. 7 is a flowchart showing an example of a predicted number of printed pages determination process.

The following is an example of the number of additional pages that is determined in S375 and S385 of FIG. 7. Assume that the scheduled rental period is "from January to June 2021" and the user history data DB2Ua of FIG. 3B indicates a history of the target user identifier UID. The correspondence between a focused month, the number of additional pages, and month and year that are used for the calculation of the number of additional pages is as follows (Table 1).

TABLE 1

| Focused month | Number of additional pages | Month and year used for calculation (Number of printed pages) |
|---|---|---|
| January | 500 | January 2018 (500) |
| February | 400 | February 2018 (500), February 2019 (300) |
| March | 2500 | March 2018 (2000), March 2019 (3000) |
| April | 1500 | April 2018 (1000), April 2019 (2000) |
| May | 500 | May 2019 (500) |
| June | 1225 | Entire period |

When the numbers of additional pages from January to June described above are used in S440 of FIG. 8, the predicted number of printed pages is the sum total of the numbers of additional pages from January to June and is 6625 pages.

In S220 of FIG. 6, the CPU 510 of the management server 500 performs a replacement condition determination process.

Figure 9:
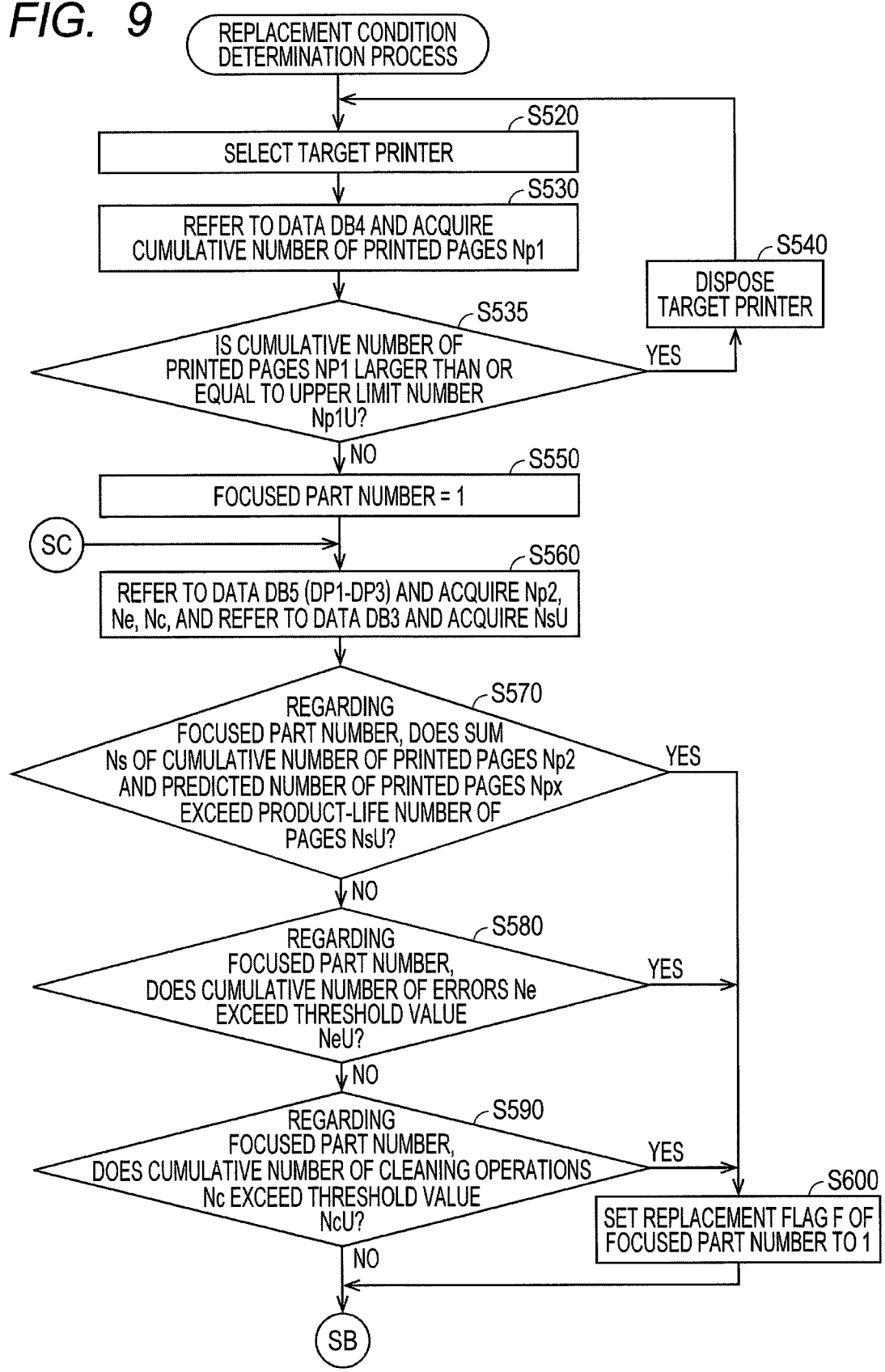
FIG. 9 is a flowchart showing an example of a replacement condition determination process.

As shown in FIG. 9, in S520, the CPU 510 of the management server 500 selects a target printer to be rented to the target user from among a plurality of rentable printers. As will be described later, of a plurality of parts of the target printer, a part(s) that satisfies the replacement condition is replaced before the target printer is rented. Thus, the CPU 510 may randomly select the target printer from among the plurality of rentable printers without searching the plurality of rentable printers for a printer suitable for the target printer.

The plurality of rentable printers is remaining printers excluding printers being rented from all the printers for rental. The list of the identifiers PID of all the printers for rental (also referred to as a complete printer list) is determined (prepared) in advance. The identifier PID of a printer being rented is set in the first data DB1 (FIG. 3A) as the rental printer identifier PIDx. Hereinafter, the printer identifier PID of the target printer selected in S520 will also be referred to as target printer identifier PID.

In S530, the CPU 510 refers to the fourth data DB4 (FIG. 3D) and acquires the printer cumulative value Np1 of the target printer. In S535, the CPU 510 determines whether the printer cumulative value Np1 of the target printer is larger than or equal to an upper limit number Np1U. The upper limit number Np1U is the number of pages indicating the life of the printer and is determined in advance. If the printer cumulative value Np1 is larger than or equal to the upper limit number Np1U (S535: Yes), in S540, the CPU 510 performs processing for disposing the target printer. For example, the CPU 510 deletes the printer identifier PID of the target printer from the complete printer list. After S540, the CPU 510 returns to S520 and selects another printer.

If the printer cumulative value Np1 is smaller than the upper limit number Np1U (S535: No), the CPU 510 extracts a part(s) that satisfies the replacement condition indicating that the part should be replaced before the target printer is rented to the target user (the details will be described later). For a replacement condition determination, the CPU 510 refers to the individual printer data (for example, the data DB5 Pa) contained in the fifth data DB5 (FIG. 4) and associated with the target printer identifier PID. Hereinafter, the individual printer data contained in the fifth data DB5 and associated with the target printer identifier PID will also be referred to as target printer data. In the following description, it is assumed that the data DB5 Pa of FIG. 4 is the target printer data (also referred to as target printer data DB5 Pa) and that the predicted number of printed pages is 6625 pages in the above-mentioned calculation example.

In S550 (FIG. 9), the CPU 510 initializes a focused part number to "1". In S560, the CPU 510 refers to the target printer data DB5 Pa (FIG. 4) and acquires parameters Np2, Ne, and Nc associated with the focused part number. Specifically, the CPU 510 refers to the part used amount data DP1 and acquires the part cumulative value Np2, refers to the part error data DP2 and acquires the cumulative number of errors Ne, and refers to the part cleaning data DP3 and acquires the cumulative number of cleaning operations Nc. The CPU 510 refers to the third data DB3 (FIG. 3C) and acquires the product-life number of pages NsU associated with the focused part number.

In S570, the CPU 510 determines whether the sum Ns of the part cumulative value Np2 and the predicted number of printed pages Npx exceeds the product-life number of pages NsU. The sum Ns exceeding the product-life number of pages NsU indicates that there is a high possibility that the first cumulative number of printed pages Np1 of the focused part number exceeds the product-life number of pages NsU during the scheduled rental period. If the determination result obtained in S570 is Yes, the CPU 510 sets, to "1", the replacement flag F contained in the target printer data DB5 Pa (FIG. 4) and associated with the focused part number in S600. After S600, the CPU 510 proceeds to S610 of FIG. 10. For example, in the example of FIG. 4, the sum Ns (41625 pages) of Np2 (35000 pages) and Npx (6625 pages) of a transfer roller exceeds NsU (40000 pages (FIG. 3C)). Thus, the replacement flag F of the transfer roller is set to "1".

Figure 10:
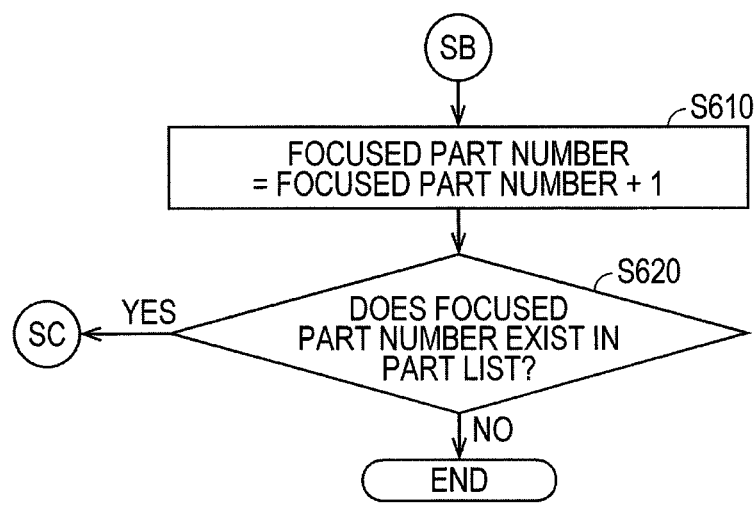
FIG. 10 is a flowchart showing the example of the replacement condition determination process.

If the determination result obtained in S570 is No, in S580, the CPU 510 determines whether the cumulative number of errors Ne exceeds an error threshold value NeU. In the present embodiment, the error threshold value NeU is determined in advance (for example, NeU=10). If the cumulative number of errors Ne exceeds the threshold value NeU, there is a high possibility that a malfunction has occurred in the part corresponding to the focused part number. If the determination result obtained in S580 is Yes, the CPU 510 sets the replacement flag F of the focused part number to "1" in S600 and proceeds to S610 (FIG. 10). For example, in the example of FIG. 4, the cumulative number of errors Ne (11) of a sheet feed unit (tray 2) exceeds the threshold value NeU (10). Thus, the replacement flag F of the sheet feed unit (tray 2) is set to "1".

If the determination result obtained in S580 is No, in S590, the CPU 510 determines whether the cumulative number of cleaning operations Nc exceeds a threshold value NcU. In the present embodiment, the threshold value NcU is determined in advance (for example, NcU=10). If the cumulative number of cleaning operations Nc exceeds the threshold value NcU, there is a high possibility that the part corresponding to the focused part number has got soiled. If the determination result obtained in S590 is Yes, the CPU 510 sets the replacement flag F of the focused part number to "1" in S600 and proceeds to S610 (FIG. 10). For example, in the example of FIG. 4, the cumulative number of cleaning operations Nc (12) of an exposure device exceeds the threshold value NcU (10). Thus, the replacement flag F of the exposure device is set to "1".

If the determination result obtained in S590 is No, the CPU 510 proceeds to S610 (FIG. 10).

In S610, the CPU 510 updates the focused part number by adding "1" to the focused part number. In S620, the CPU 510 determines whether the updated focused part number exists in a part list. The part list is the list of all the parts which are the processing target of the replacement condition determination process. In the present embodiment, the part list is the list of a plurality of parts registered in the data DB3 and DB5 (FIG. 3C, FIG. 4).

If the focused part number exists in the part list (S620: Yes), the CPU 510 returns to S560 (FIG. 9) and performs the processing on the new focused part number. If the focused part number does not exist in the part list (S620: No), in other words, if the processing has been performed on all the parts, the CPU 510 ends the processing of FIGS. 9 and 10 (that is, S220 of FIG. 6).

In S230 of FIG. 6, the CPU 510 of the management server 500 generates target part data indicating the list of target parts which are parts that satisfy the replacement condition. In the present embodiment, the CPU 510 refers to the target printer data (for example, the data DB5 Pa) of the fifth data DB5 (FIG. 4), and generates the list of the part numbers PNB of the parts with the replacement flag F="1" as the target part data. The CPU 510 then outputs the generated target part data to the management terminal 300. The CPU 310 of the management terminal 300 refers to the received target part data and displays the list of the target parts on the display 340 (not shown).

In S240, by viewing the list of the target parts displayed on the display 340, the operator identifies a target part to be replaced. The operator then takes the target printer apart and replaces the target part with a new part.

In S250, the operator enters the part number PNB of the replaced part into the management terminal 300 by operating the operation interface 350. In S260, the CPU 310 of the management terminal 300 transmits replacement data indicating the entered part number PNB to the management server 500.

Figure 11:
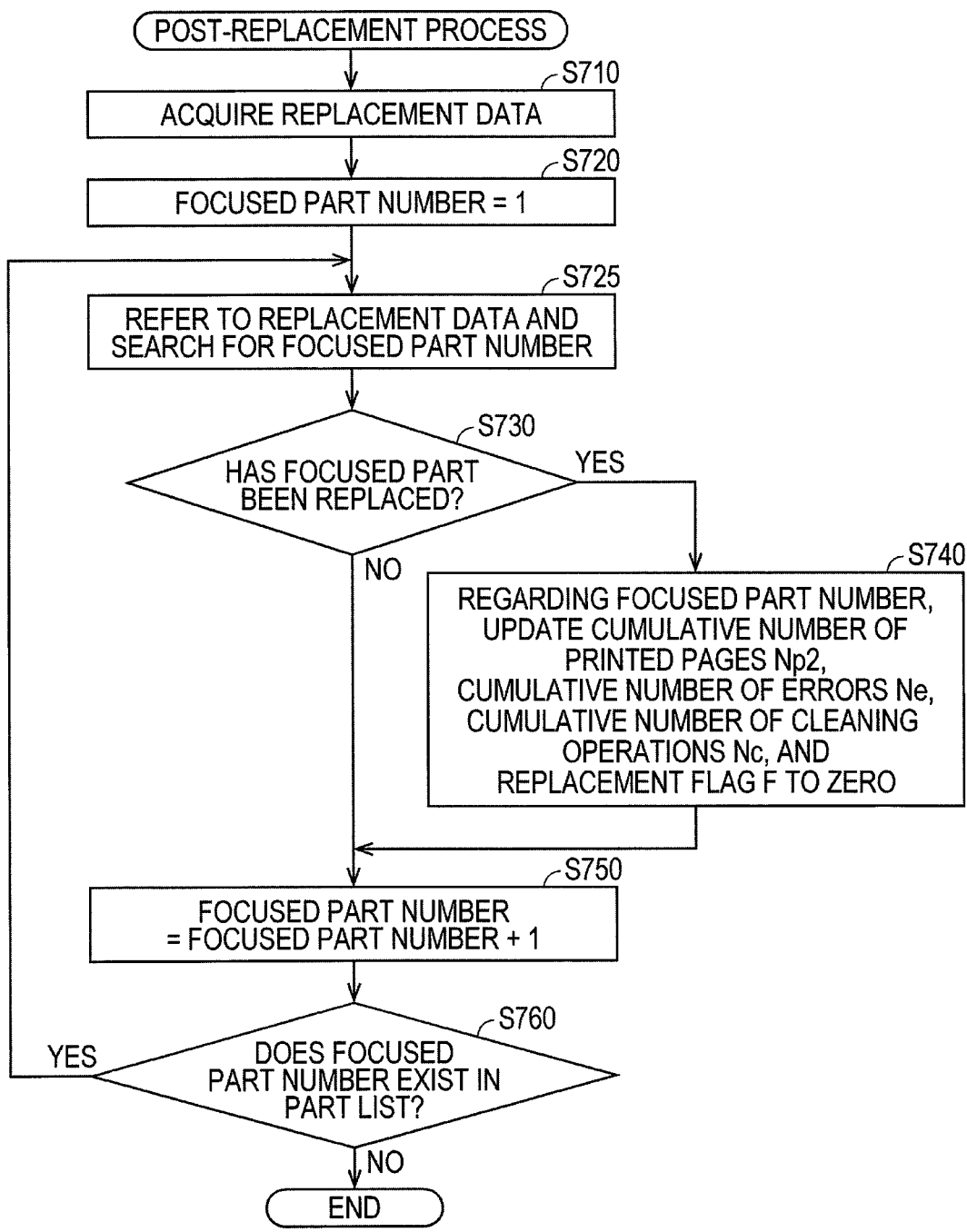
FIG. 11 is a flowchart showing an example of a post-replacement process.

In S270, the CPU 510 of the management server 500 performs a post-replacement process in response to reception of the replacement data. As shown in FIG. 11, in S710, the CPU 510 acquires the replacement data. In S720, the CPU 510 initializes the focused part number to "1". In S725, the CPU 510 refers to the replacement data and searches for the focused part number. In S730, the CPU 510 determines whether the part corresponding to the focused part number has been replaced. If the focused part number is found in the replacement data by the search, the determination result obtained in S730 is Yes. In this case, in S740, the CPU 510 updates the target printer data (for example, the data DB5 Pa) of the fifth data DB5 (FIG. 4). Specifically, the CPU 510 sets each of the part cumulative value Np2, the cumulative number of errors Ne, the cumulative number of cleaning operations Nc, and the replacement flag F of the focused part number to "zero". In the example of FIG. 4, the "transfer roller", the "sheet feed unit (tray 2)", and the "exposure device" are replaced and Np2, Ne, Nc, and F of these parts are set to zero. Then, the CPU 510 proceeds to S750.

If the focused part number is not found in the replacement data by the search, that is, the part corresponding to the focused part number has not been replaced (S730: No), the CPU 510 proceeds to S750 without performing S740.

In S750, the CPU 510 updates the focused part number by adding "1" to the focused part number. In S760, the CPU 510 determines whether the updated focused part number exists in the part list. A determination condition of S760 is the same as the determination condition of S620 of FIG. 10. If the focused part number exists in the part list (S760: Yes), the CPU 510 returns to S725 and performs the processing on the new focused part number. If the focused part number does not exist in the part list (S760: No), in other words, if the processing has been performed on all the parts, the CPU 510 ends the processing of FIG. 11 (that is, S270 of FIG. 6). This is the end of the processing of FIG. 6.

As described above, in the present embodiment, the CPU 510 of the management server 500 performs the following processing in accordance with the program PG5. In S210 of FIG. 6 (specifically, S350, S370, and S380 of FIG. 7), the CPU 510 refers to the history data DB2 (FIG. 3B). The history data DB2 indicates the history information DB2i including a use history of a printer of each of a plurality of users. In S210 and S220 of FIG. 6, for each of a plurality of parts included in a target printer, the CPU 510 determines whether a part satisfies the replacement condition using the history information DB2i and a scheduled rental period. The replacement condition indicates that the part should be replaced before the target printer is rented to a target user. In this way, the CPU 510 appropriately determines whether each of the plurality of parts included in the target printer satisfies the replacement condition.

Figure 8:
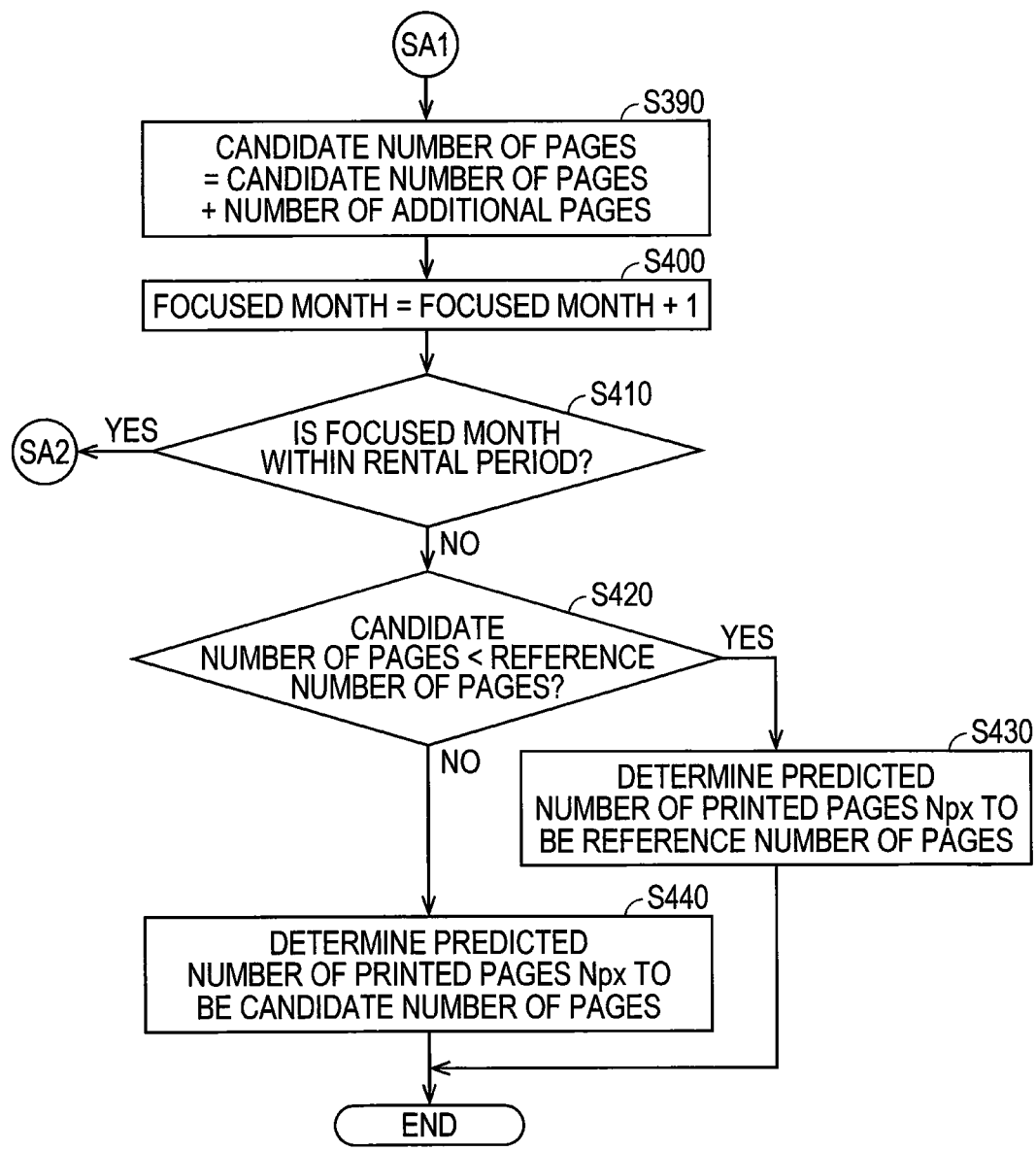
FIG. 8 is a flowchart showing the example of the predicted number of printed pages determination process.

In S210 of FIG. 6, as described in FIGS. 7 and 8, the CPU 510 determines the predicted number of printed pages Npx in the scheduled rental period by using the history information DB2i and the scheduled rental period. In S220 of FIG. 6, as described in FIGS. 9 and 10, the CPU 510 determines whether a part satisfies the replacement condition by using the predicted number of printed pages Npx. The CPU 510 appropriately determines whether a part satisfies the replacement condition by using the predicted number of printed pages Npx.

A first condition C1 of FIG. 7 is a condition that the result obtained in S345 is Yes and the result obtained in S365 is Yes. The first condition C1 indicates that the history information DB2i contains a history of first type (target-user) past-same-period used amount. In the present embodiment, the first type past-same-period used amount is the number of printed pages NP printed by the target user in the same month of the past year as a focused month included in the scheduled rental period. If the first condition C1 is satisfied (S345: Yes, S365: Yes), as described in S370, S375, S390, and S440 (FIGS. 7 and 8), the CPU 510 determines the predicted number of printed pages Npx by using the first type past-same-period used amount (in the present embodiment, the predicted number of printed pages Npx is determined by using the average value of the first type past-same-period used amount (S375)). It is estimated that the number of pages printed by the user in the focused month included in the scheduled rental period will be nearly equal to the number of printed pages NP printed in the same month of the past year. Thus, the CPU 510 appropriately determines the predicted number of printed pages Npx by using the first type past-same-period used amount.

A second condition C2 of FIG. 7 is a condition that the result obtained in S345 is Yes and the result obtained in S365 is No. The second condition C2 indicates that the history information DB2i does not contain a history of the above-mentioned first type past-same-period used amount and contains a history of first type past used amount. In the present embodiment, the first type past used amount is the number of printed pages NP in the past years (that is, during the entire past period) by the target user. If the second condition C2 is satisfied (S345: Yes, S365: No), as described in S380, S385, S390, and S440 (FIGS. 7 and 8), the CPU 510 determines the predicted number of printed pages Npx by using the first type past used amount (in the present embodiment, the predicted number of printed pages Npx is determined by using the average value of the first type past used amount (S385)). The number of printed pages NP sometimes varies greatly among a plurality of users. In the present embodiment, if the second condition C2 is satisfied, the CPU 510 determines the predicted number of printed pages Npx for the target user by using the number of printed pages NP in the past year by the target user, not the number of printed pages NP in the past year by a user different from the target user. Thus, the CPU 510 appropriately determines the predicted number of printed pages Npx.

A third condition C3 of FIG. 7 is a condition that the result obtained in S345 is No. The third condition C3 indicates that the history information DB2i does not contain a history of the number of printed pages NP in the past year by the target user. In the present embodiment, the history data DB2 (FIG. 3B) indicates histories of the numbers of printed pages NP printed by many users in one or more years in the past. Thus, the history data DB2 contains a history of the number of printed pages NP printed by users different from the target user in an arbitrary month. Thus, the third condition C3 indicates that the history information DB2i does not contain a history of the number of printed pages NP in the past year by the target user and contains a history of second type (other-user) past-same-period used amount. In the present embodiment, the second type past-same-period used amount is the number of printed pages NP printed by users different from the target user in the same month of the past year as the focused month included in the scheduled rental period.

If the third condition C3 is satisfied (S345: No), as described in S350, S355, S390, and S440 (FIGS. 7 and 8), the CPU 510 determines the predicted number of printed pages Npx by using the second type past-same-period used amount. In the present embodiment, the predicted number of printed pages Npx is determined by using the average value of the second type past-same-period used amounts (S355). Sometimes the number of printed pages NP is heavily influenced by a month. It is expected that the number of printed pages NP in the focused month will be nearly equal to the number of printed pages NP in the same month of the past year. In the present embodiment, if the third condition C3 is satisfied, the CPU 510 determines the predicted number of printed pages Npx by using the number of printed pages NP printed in the same month as the focused month (that is, the second type past-same-period used amount), not the number of printed pages NP printed in months different from the focused month. Thus, the CPU 510 appropriately determines the predicted number of printed pages Npx.

As described in S420 and S430 of FIG. 8, if the predicted number of printed pages Npx is smaller than the reference number of pages, the CPU 510 determines the predicted number of printed pages Npx to be the reference number of pages. If the predicted number of printed pages Npx is excessively small, a replacement condition determination that is made using the predicted number of printed pages Npx might be performed in an inappropriate manner. For example, a part that could cause a malfunction during the rental period might be determined not to satisfy the replacement condition. In the present embodiment, the CPU 510 suppresses such a determination.

In S560 of FIG. 9, the CPU 510 refers to the part used amount data DP1 (FIG. 4) indicating the part cumulative value Np2 (an example of a cumulative used amount of a part) of each of a plurality of parts included in the target printer. The replacement condition determination process (FIGS. 9 and 10) includes processing of S570 and S600. If a condition of S570 is satisfied, the CPU 510 performs S600, in other words, determines that a part with the focused part number satisfies the replacement condition. The condition of S570 is that the sum Ns of the part cumulative value Np2 and the predicted number of printed pages Npx which are associated with the focused part number exceeds the product-life number of pages NsU associated with the focused part number. In this way, the CPU 510 appropriately determines that a part that could cause a malfunction during the scheduled rental period satisfies the replacement condition. The predicted number of printed pages Npx is an example of a predicted used amount. The product-life number of pages NsU is an example of an upper limit used amount.

In S560 of FIG. 9, the CPU 510 refers to the part error data DP2 (FIG. 4) indicating the cumulative number of errors Ne of each of the plurality of parts included in the target printer. The replacement condition determination process (FIGS. 9 and 10) includes processing of S580 and S600. If a condition of S580 is satisfied, the CPU 510 performs S600, in other words, determines that a part with the focused part number satisfies the replacement condition. The condition of S580 is that the cumulative number of errors Ne associated with the focused part number exceeds the error threshold value NeU. In this way, the CPU 510 appropriately determines that a part that could cause a malfunction satisfies the replacement condition.

In S725 of FIG. 11, the CPU 510 refers to the replacement data indicating the part number PNB of the replaced part out of the plurality of parts included in the target printer. In S740, the CPU 510 updates both the part cumulative value Np2 and the cumulative number of errors Ne of the replaced part to zero, by which the part used amount data DP1 and the part error data DP2 are updated. Thus, the CPU 510 appropriately performs the next replacement condition determination process for the target printer by referring to the part used amount data DP1 and the part error data DP2.

In S230 of FIG. 6, the CPU 510 outputs the target part data indicating a target part which is a part included in the plurality of parts of the target printer and determined to satisfy the replacement condition. The outputted target part data is usable in various processing such as replacement of the target part. In the present embodiment, the target part data is outputted to the management terminal 300. The management terminal 300 refers to the target part data and displays a list of target parts on the display 340. Thus, by viewing the display 340, the operator easily identifies a part to be replaced.

The CPU 210 of the user terminal 200 may perform various processes for using the printer 100. For example, the CPU 210 may perform a process for registering a user in the management server 500. This function may be implemented by the program PG2 or other programs.

B. Second Embodiment

A rental printer may be an inkjet printer. The printer information transmission process of FIG. 5 and the management process of FIG. 6 are also applicable to an inkjet printer.

Figure 12:
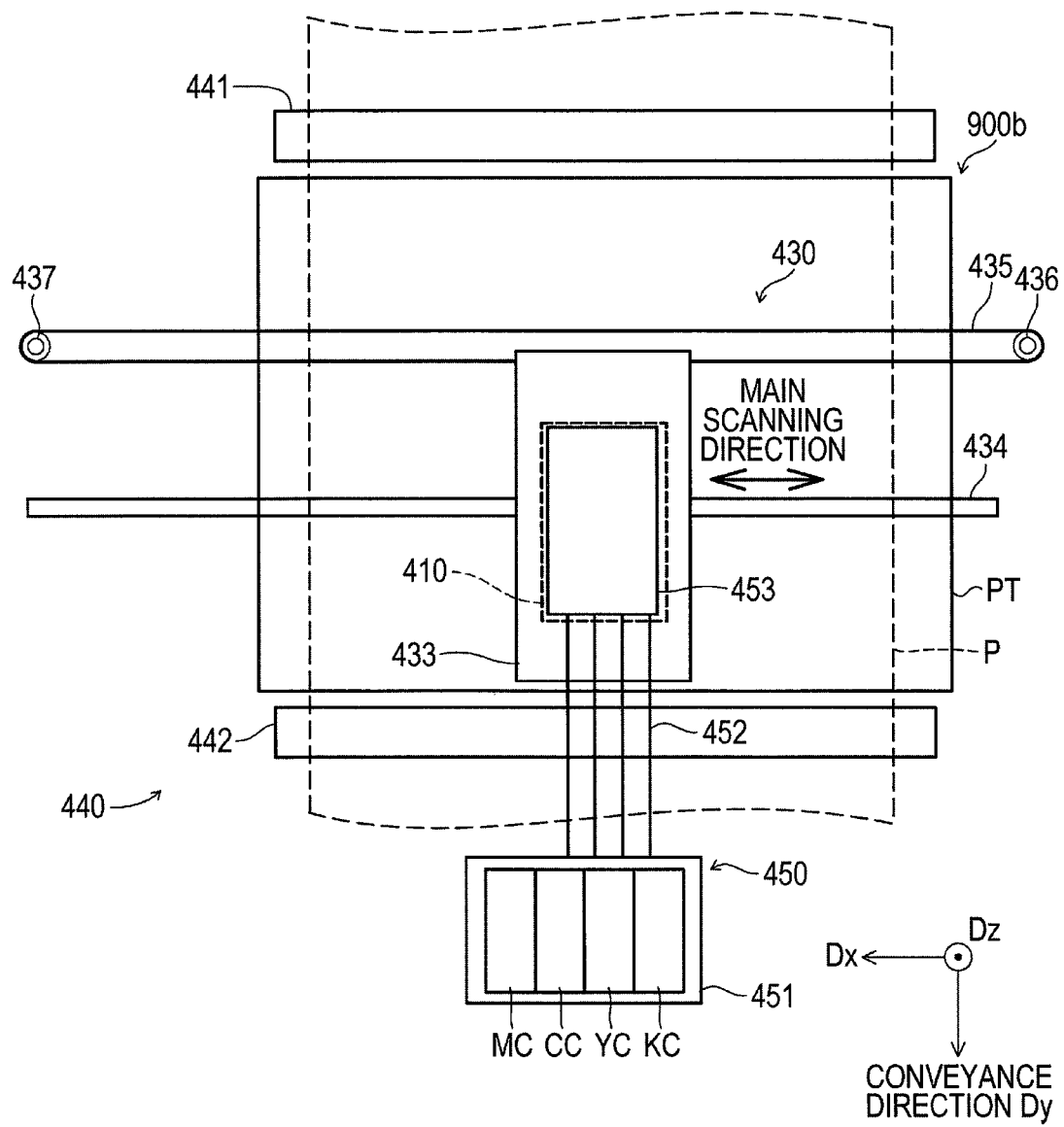
FIG. 12 is a schematic diagram showing an example of an inkjet print engine.

A print engine 900b of FIG. 12 includes a print head 410 (also referred to simply as a head 410), a first movement device 430, a second movement device 440, and an ink supply unit 450.

The first movement device 430 includes a carriage 433, a slide shaft 434, a belt 435, and a plurality of pulleys 436 and 437. The head 410 is mounted on the carriage 433. The slide shaft 434 holds the carriage 433 in such a way as to allow the carriage 433 to reciprocate in a main scanning direction (a direction parallel to a Dx direction). The belt 435 is wound on the pulleys 436 and 437 so as to run therebetween, and a part thereof is fixed to the carriage 433. The pulley 436 is rotated by the power of an unillustrated main scanning motor. When the main scanning motor rotates the pulley 436, the carriage 433 moves along the slide shaft 434. This realizes main scanning by which the head 410 is moved with respect to a sheet P in the main scanning direction.

The second movement device 440 includes a platen PT configured to support the sheet P, a first conveyance roller 441 and a second conveyance roller 442 that are configured to hold the sheet P placed on the platen PT, and an unillustrated conveyance motor that drives the rollers 441 and 442. The sheet P is fed from an unillustrated sheet tray to the second movement device 440 by an unillustrated sheet feed roller. The sheet P fed to the second movement device 440 is sandwiched between the first conveyance roller 441 and an unillustrated follow roller paired with the first conveyance roller 441 and is conveyed in a sub-scanning direction Dy by these rollers. The conveyed sheet P is sandwiched between the second conveyance roller 442 and an unillustrated follow roller paired with the second conveyance roller 442 and is conveyed in the sub-scanning direction Dy by these rollers.

The ink supply unit 450 includes a cartridge mount section 451, a tube 452, and a buffer tank 453. Four ink cartridges KC, YC, CC, and MC for four colors of KYCM are detachably mounted on the cartridge mount section 451. The tube 452 is a flexible tube serving as an ink channel and connecting between the cartridge mount section 451 and the buffer tank 453. The ink inside each ink cartridge is supplied to the head 410 via the cartridge mount section 451, the tube 452, and the buffer tank 453.

Though not shown in the drawing, the print head 410 includes a four nozzle groups for four colors of KYCM. The print head 410 forms dots in a band region on the sheet P extending in the main scanning direction by causing drops of ink to be jetted out of the nozzles during main scanning (also referred to as partial printing). The print engine 900b prints an image on the sheet P by repeating partial printing and conveyance of the sheet P.

FIG. 13A shows an example of third data DB3b and FIG. 13B shows an example of individual printer data DB5bPa of fifth data DB5b. A part which is the processing target of the replacement condition determination process is selected from among a plurality of parts of the print engine 900b (FIG. 12). In the examples of FIGS. 13A and 13B, a print head, a conveyance roller, and a carriage are the processing target. The print engine 900b is configured to perform cleaning processing by which ink droplets are ejected from the plurality of nozzles of the print head 410 toward an unillustrated ink receiving section (for example, a sponge). The cumulative number of cleaning operations Nc of the print head 410 indicates the cumulative number of the cleaning operations.

C. Modifications (1) The method for determining the predicted number of printed pages may be various methods for determining the predicted value of the number of printed pages during the scheduled rental period, instead of the methods shown in FIGS. 7 and 8. For example, in S355, S375, and S385 of FIG. 7, the number of additional pages may be various values calculated according to a particular function by using one or more number of printed pages NP such as a median value and a mode value instead of an average value.

When the determination result of S345 in FIG. 7 is No, the CPU 510 may further refer to the history data DB2 (FIG. 3B) and search for the number of printed pages NP (that is, second type past-same-period used amount) by other users different from the target user in the same month as the focused month included in the scheduled rental period, the same month being a month in past years. If the second type past-same-period used amount is found, the CPU 510 may execute S350 and S355. If the second type past-same-period used amount is not found, the CPU 510 may determine the number of additional pages by various methods. For example, the CPU 510 refers to the history data DB2 and acquires the number of printed pages NP in the past entire period of other users. Then, the CPU 510 determines the number of additional pages by using the acquired number of printed pages NP (for example, an average value, a median value, a mode value, and so on, of the acquired number of printed pages NP). According to this configuration, the CPU 510 determines an appropriate predicted number of printed pages Npx when the history information DB2i does not include the second type past-same-period used amount.

When the determination result of S345 in FIG. 7 is No, the CPU 510 may determine the number of additional pages (for example, an average value, a median value, a mode value, and so on) by using the number of printed pages NP of the other users in the entire period in the past, regardless of whether the history information DB2i includes the second type past-same-period used amount. Further, S365, S370, and S375 in FIG. 7 may be omitted. For example, if the determination result of S345 is Yes, the CPU 510 may execute S380 and S385. Further, the CPU 510 may determine the number of additional pages (for example, an average value, a median value, a mode value, and so on) by using the number of printed pages NP of a plurality of users including the target user and other users in the entire period, regardless of whether the history information DB2i (FIG. 3B) includes the use history of the target user. Here, the CPU 510 may use the number of printed pages NP of the focused month instead of the entire period.

In either case, each of the plurality of users may be associated with one of a plurality of categories (for example, a plurality of categories corresponding to a plurality of industries). Then, when the CPU 510 uses the number of printed pages NP of other users different from the target user, the CPU 510 may use the number of printed pages NP of other users included in the same category as the target user, without using the number of printed pages NP of other users included in categories different from the category of the target user.

S420 and S430 in FIG. 8 may be omitted. Further, the CPU 510 may use a focused period of various lengths included in the scheduled rental period, such as a focused date and a focused week, instead of a focused month (an example of a unit period) to determine the number of additional pages and thus determine the predicted number of printed pages Npx. The processes of FIGS. 7 and 8 may be applied to various focused periods.

(2) A plurality of rental printers may include printers of a plurality of models. For example, the plurality of models of the rental printer may include the following four models: (A) first type laser, (B) second type laser, (C) first type inkjet, and (D) second type inkjet. The user may rent a printer of any of the plurality of models. The use history of the target user may include, for example, the use history of each of the following four printers: (A) first printer (first type laser), (B) second printer (first type laser), (C) third printer (second type laser), and (D) fourth printer (first type inkjet). Here, the first and second printers are the same first type laser printers.

Here, the recording method (FIG. 5: S135) of the printer's use history (FIG. 3B) may be various methods. The history recording method may be, for example, one of the following three history recording methods. Regardless of which history recording method is adopted, the management process (particularly, the predicted number of printed pages determination process) may be the same as the process in the above embodiment (FIGS. 6 to 10) or the process in modifications, except that the history data which is referred to is different.

A first history recording method is a method of recording the use history of the printer by using the history data (FIG. 3B) for each model of the printer. The correspondence between the above first to fourth printer and the history data used for recording the use history is as follows:

(A) first printer (first type laser): first history data,
(B) second printer (first type laser): first history data,
(C) third printer (second type laser): second history data, and
(D) fourth printer (first type inkjet): third history data.

Since the first printer and the second printer are printers of the same first type laser, the CPU 510 records the use history of the first printer and the use history of the second printer in a common first history data. First to third history data do not distinguish between individual printers. The first to third history data are all included in the individual user data associated with the same target user. When the target user rents a new printer, the CPU 510 determines the predicted number of printed pages by referring to the history data associated with the printer model requested by the target user. The correspondence between the printer model example and the history data which is referred to is as follows:

(A) first type laser: first history data,
(B) first type inkjet: third history data, and
(C) second type inkjet: history data of second type inkjet of other users.

Since the individual user data of the target user does not include the history data of the second type inkjet, the CPU 510 refers to the history data of the second type inkjet of the other users for the second type inkjet (FIG. 7, S345: No).

A second history recording method is a method of recording the use history of all printers by using one common history data. The correspondence between the first to fourth printers and the history data used to record the use history is as follows:

(A) first printer (first type laser): fourth history data,
(B) second printer (first type laser): fourth history data,
(C) third printer (second type laser): fourth history data, and
(D) fourth printer (first type inkjet): fourth history data.

The CPU 510 records the use history of all printers in the common fourth history data. The fourth history data does not distinguish between individual printers. The fourth history data is included in the individual user data associated with the target user. When the target user rents a new printer, the CPU 510 determines the predicted number of printed pages by referring to the fourth history data, regardless of the printer model and printing method requested by the target user. The correspondence between examples of the printer model and the history data which is referred to is as follows:

(A) first type laser: fourth history data,
(B) first type inkjet: fourth history data, and
(C) second type inkjet: fourth history data.

A third history recording method is a method of recording the use history of the printer by using the history data for each of printing methods (that is, laser or inkjet in this example). The correspondence between the above first to fourth printers and the history data used for recording the use history is as follows:

(A) first printer (first type laser): fifth history data,
(B) second printer (first type laser): fifth history data,
(C) third printer (second type laser): fifth history data, and
(D) fourth printer (first type inkjet): sixth history data.

The fifth history data indicates the use history of the laser printer, and the sixth history data indicates the use history of the inkjet printer. Neither the fifth history data nor the sixth history data distinguish between individual printers. Both the fifth and sixth history data are included in the individual user data associated with the same target user. When the target user rents a new printer, the CPU 510 determines the predicted number of printed pages by referring to the history data associated with the printing method requested by the target user. The correspondence between examples of the printer model and the history data which is referred to is as follows:

(A) first type laser: fifth history data,
(B) first type inkjet: sixth history data, and
(C) second type inkjet: sixth history data.

(3) The replacement condition is not limited to the conditions shown in FIG. 9 and FIG. 10. The replacement condition may be various conditions determined by using the history information DB2*i* including the use history of printer of each of a plurality of users and the scheduled rental period. For example, S580 in FIG. 9 may be omitted.

In this case, the part error data DP2 may be omitted from the fifth data DB5 and DB5*b* (FIG. 4, FIG. 13B). In S740 of FIG. 11, the reset of cumulative number of errors Ne may be omitted. In addition, S590 in FIG. 9 may be omitted. In this case, the part cleaning data DP3 is omitted from the fifth data DB5 and DB5*b*. In S740 of FIG. 11, the reset of the cumulative number of cleaning times Nc may be omitted.

(4) Not only the number of printed pages but also various parameters indicating the used amount may be used to determine whether the replacement condition is satisfied. The used amount may be various parameters indicating the amount of printing, such as "number of printed pages", "number of times of replacement of a cartridge containing printing material (ink, toner, and so on)", "number of rotations of a roller", "used amount of printing material", "operating time of the printer", and so on. As the "used amount of printing material", for example, "total number of printed dots (also called dot count)" may be used.

In the above embodiment, the predicted number of printed pages Npx is common to the plurality of parts, and indicates the predicted used amount of each of the plurality of parts. In S210 in FIG. 6, the CPU510 determines the predicted used amount of each of the plurality of parts by determining the predicted number of printed pages Npx.

Alternatively, the CPU 510 may determine the predicted used amount for each part. For example, the number of rotations or the number of printed pages may be used as the used amount of rollers such as the drive roller 991 (FIG. 2). As the used amount of the print head 410 (FIG. 12), the dot count or the cumulative number of cleaning times may be used. As the used amount of the carriage 433, a cumulative movement distance or a number of printed pages may be used. Here, the history information indicated by history data may indicate the history of the used amount of each of the plurality of parts. The CPU 510 may determine the predicted used amount of the plurality of part by using such history information and the scheduled rental period. For example, the CPU 510 may determine the predicted used amount of each part by executing the processes shown in FIGS. 7 and 8 for each part. In the processing of S220 in FIG. 6 (for example, S570 in FIG. 9), the CPU 510 uses the predicted used amount associated with the focused part in order to determine whether the focused part satisfies the replacement condition.

In this way, the CPU510 may use one predicted used amount in common in order to determine the replacement condition of each of the plurality of parts. Alternatively, the CPU 510 may use the corresponding predicted used amount in order to determine the replacement condition of the part associated with the predicted used amount.

(5) The target part of the replacement condition determination process (FIG. 6: S220) is not limited to the parts described in FIG. 3C and FIG. 13A, but may be any part included in the printer. Further, containers containing printing materials such as ink and toner (for example, the development cartridge 910 (FIG. 2), the ink cartridges MC, CC, YC, KC (FIG. 12), and so on) may be replaced according to the determination result of the replacement condition determination process. In this way, various parts included in the printer may be the target of the replacement condition determination process.

(6) In S230 of FIG. 6, the CPU 510 may output target part data (more generally, target part data indicating a target part that satisfies the replacement condition) to various devices instead of the management terminal 300. For example, the CPU 510 may output the target part data to the memory 515 inside the management server 500 (for example, the non-volatile memory 530) or an external memory connected to the management server 500. In this case, the CPU 510 stores the target part data in the memory. Further, the CPU 510 may output the target part data to a display device such as a liquid crystal display. In this case, the CPU 510 displays the information indicating the target part on the display device.

(7) In S210 and S220 in FIG. 6 (for example, S340, S350, S370, S380 in FIGS. 7, S530 and S560 in FIG. 9), the CPU 510 of the management server 500 refers to the data by reading out at least part of data from the storage area of the non-volatile memory 530. For example, in S380 in FIG. 7, the CPU 510 refers to the history data DB2 by reading out at least part of the history data DB2. Referring to data is not limited to reading data, but may include various other processes. For example, the data DB1 to DB5 may be managed by a data management apparatus (for example, a database server) different from the management server 500. The CPU 510 of the management server 500 transmits, to the database server, a query inquiring about the information indicated by the data (for example, the history data DB2). The database server transmits data indicating the information requested by the query to the management server 500. In this way, referring to the data may be performed by transmitting a query. In this case, in S130, S150, and S170 in FIG. 5, the CPU 110 of the printer 100 transmits the data to the database server instead of the management server 500. In S135, S155, and S175, the database server updates various data (for example, data DB2, DB4, DB5, and so on) by using the data from the printer 100. The function of the database server may be realized by the management server 500. The CPU 510 may operate as a database processing unit by executing a program different from the program PG5. In this case, in S210 and S220 in FIG. 6, the CPU 510 may transmit a query to the database processing unit that operates on the management server 500. In general, the "process of referring to data" may be various processes for acquiring data indicating at least part of the information indicated by the data.

(8) The configuration of the printer may be various configurations capable of printing an image, instead of the configurations shown in FIGS. 2 and 12. For example, the printer may be a printer that uses printing material of one color (for example, black K). The printer may also be various apparatuses including a print engine configured to perform printing. For example, the printer may be an apparatus including a print engine and a scanner (reading execution unit), such as a multifunction peripheral (MFP), a copier, a facsimile apparatus, and so on. The scanner generates image data of the scanned document by optically scanning a document.

(9) Instead of the management server 500, various other apparatuses may determine whether a printer part satisfies the replacement condition. For example, the management terminal 300 may execute the processes of S210 and S220 in FIG. 6, instead of the management server 500. Here, the management server 500 may function as a database server that manages the data DB1 to DB5. The CPU 310 of the management terminal 300 may acquire various information from the management server 500 by transmitting a query to the management server 500. Further, each of a plurality of apparatuses (for example, computers) that communicate with each other through a network may perform a part of the function of determining whether a printer part satisfies the replacement condition, and may provide the function as a whole. In this case, a system including these apparatuses serves as a management apparatus.

In each of the above embodiments, a part of the configuration realized by the hardware may be replaced with the software, and conversely, a part or all of the configuration realized by the software may be replaced with the hardware. For example, the function of the replacement condition determination process (S220) shown in FIG. 6 may be realized by a dedicated hardware circuit.

When some or all of the functions of the present disclosure are realized in a computer program, the program may be provided in a form stored in a computer-readable storage medium (for example, a non-transitory storage medium). The program may be used in the same or different storage medium (computer readable storage medium) as it was provided. The "computer-readable storage medium is not limited to a portable storage medium such as a memory card and a CD-ROM, but may include an internal memory in a computer such as various ROMs and an external memory connected to a computer such as a hard disk drive.

While the disclosure has been described in detail with reference to the above aspects thereof, it would be apparent to those skilled in the art that various changes and modifications may be made therein without departing from the scope of the claims. The disclosure includes its equivalents.

What is claimed is:

1. A non-transitory computer-readable storage medium storing a set of program instructions for a computer configured to manage rental printers, the computer comprising a controller and a memory, the set of program instructions, when executed by the controller, causing the computer to perform:
acquiring directly from one or more sensors in each of a plurality of printers, sensor data indicative of history information indicating a printer use history of each of a plurality of users;
storing in a database the history information of each of the plurality of printers associated with printer identification information and user identification information for each of the plurality of printers and users;
acquiring directly from a target printer a target user identification information and a scheduled rental period for the target printer, the scheduled rental period being a rental period during which the target printer is scheduled to be rented by a target user;
determining, by the controller, whether the history information stored in the database includes a history of the target user;
in response to determining that the history information includes a history of a target-user past-same-period used amount, the target-user past-same-period used amount being a used amount by the target user during a same unit period as a unit period included in the scheduled rental period, the same unit period being a unit period in a past year, determining, by the controller, a predicted used amount of a part by using the target-user past-same-period used amount and the scheduled rental period, the predicted used amount being a predicted used amount of the part during the scheduled rental period; and
determining, by the controller, for the part of the target printer to be rented to the target user, whether the part satisfies a replacement condition by using the history information, the predicted used amount and the scheduled rental period, the replacement condition indicating that the part should be replaced before the target printer is rented to the target user.

2. The non-transitory computer-readable storage medium according to claim 1, wherein the determining the predicted used amount includes:
in response to determining that the history information includes a history of a target-user past used amount and does not include a history of the target-user past-same-period used amount, the target-user past used amount being a used amount by the target user during an entire past period, determining the predicted used amount by using the target-user past used amount.

3. The non-transitory computer-readable storage medium according to claim 1, wherein the determining the predicted used amount includes:
in response to determining that the history information includes a history of an other-user past-same-period used amount and does not include a history of a past used amount by the target user, the other-user past-same-period used amount being a used amount by a user different from the target user during a same unit period as a unit period included in the scheduled rental period, the same unit period being a unit period in a past year, determining the predicted used amount by using the other-user past-same-period used amount.

4. The non-transitory computer-readable storage medium according to claim 1, wherein the determining the predicted used amount includes:
in response to determining that the predicted used amount is smaller than a reference used amount, changing the predicted used amount to be the reference used amount.

5. The non-transitory computer-readable storage medium according to claim 1, wherein the set of program instructions, when executed by the controller, causes the computer to further perform:
referring to part used amount data indicating a cumulative used amount of the part; and
wherein the determining whether the part satisfies the replacement condition includes:
determining that the part satisfies the replacement condition in response to determining that a sum of the cumulative used amount and the predicted used amount of the part exceeds an upper limit used amount associated with the part.

6. The non-transitory computer-readable storage medium according to claim 1, wherein the set of program instructions, when executed by the controller, causes the computer to further perform:
referring to part error data indicating a cumulative number of errors of the part; and
wherein the determining whether the part satisfies the replacement condition includes:
determining that the part satisfies the replacement condition in response to determining that the cumulative number of errors of the part exceeds an error threshold value.

7. The non-transitory computer-readable storage medium according to claim 6, wherein the set of program instructions, when executed by the controller, causes the computer to further perform:
referring to replacement data indicating a replaced part out of a plurality of parts included in the target printer; and
updating both of the cumulative used amount and the cumulative number of errors for the replaced part to zero.

8. The non-transitory computer-readable storage medium according to claim 1, wherein the set of program instructions, when executed by the controller, causes the computer to further perform:
outputting target part data indicating a replacement target part that is the part for which the replacement condition is satisfied, the replacement target part being a part out of a plurality of parts included in the target printer.

9. The non-transitory computer-readable storage medium according to claim 1, wherein the predicted used amount is a predicted number of printed pages.

10. The non-transitory computer-readable storage medium according to claim 1, wherein the set of program instructions, when executed by the controller, causes the computer to further perform:
referring to part cleaning data indicating a cumulative number of cleaning operations of the part; and
wherein the determining whether the part satisfies the replacement condition includes:
determining that the part satisfies the replacement condition in response to determining that the cumulative number of cleaning operations of the part exceeds a cleaning threshold value.

11. The non-transitory computer-readable storage medium according to claim 1, wherein the rental printers include a first-type printer and a second-type printer different from the first-type printer;
wherein the history information includes:
first history data indicating the printer use history of the first-type printer; and
second history data indicating the printer use history of the second-type printer; and
wherein the determining the predicted used amount includes:
in a case where the target printer is the first-type printer, determining the predicted used amount by using the first history data and the scheduled rental period; and
in a case where the target printer is the second-type printer, determining the predicted used amount by using the second history data and the scheduled rental period.

12. A management method of managing rental printers, the management method comprising:
acquiring directly from one or more sensors in each of a plurality of printers, sensor data indicative of history information indicating a printer use history of each of a plurality of users;
storing in a database the history information of each of the plurality of printers associated with printer identification information and user identification information for each of the plurality of printers and users;
acquiring directly from a target printer a target user identification information and a scheduled rental period for the target printer, the scheduled rental period being a rental period during which the target printer is scheduled to be rented by a target user;
determining, by a controller, whether the history information stored in the database includes a history of the target user;
in response to determining that the history information includes a history of a target-user past-same-period used amount, the target-user past-same-period used amount being a used amount by the target user during a same unit period as a unit period included in the scheduled rental period, the same unit period being a unit period in a past year, determining, by the controller, a predicted used amount of a part by using the target-user past-same-period used amount and the scheduled rental period, the predicted used amount being a predicted used amount of the part during the scheduled rental period; and determining, by the controller, for the part of the target printer to be rented to the target user, whether the part satisfies a replacement condition by using the history information, the predicted used amount and the scheduled rental period, the replacement condition indicating that the part should be replaced before the target printer is rented to the target user.

13. A management apparatus configured to manage rental printers, the management apparatus comprising:

a controller; and a memory storing a set of program instructions, when executed by the controller, causing the management apparatus to perform:

acquiring directly from one or more sensors in each of a plurality of printers, sensor data indicative of history information indicating a printer use history of each of a plurality of users;

storing in a database the history information of each of the plurality of printers associated with printer identification information and user identification information for each of the plurality of printers and users;

acquiring directly from a target printer a target user identification information and a scheduled rental period for the target printer, the scheduled rental period being a rental period during which the target printer is scheduled to be rented by a target user;

determining, by the controller, whether the history information stored in the database includes a history of the target user;

in response to determining that the history information includes a history of a target-user past-same-period used amount, the target-user past-same-period used amount being a used amount by the target user during a same unit period as a unit period included in the scheduled rental period, the same unit period being a unit period in a past year, determining, by the controller, a predicted used amount of a part by using the target-user past-same-period used amount and the scheduled rental period, the predicted used amount being a predicted used amount of the part during the scheduled rental period; and determining, by the controller, for the part of the target printer to be rented to the target user, whether the part satisfies a replacement condition by using the history information, the predicted used amount and the scheduled rental period, the replacement condition indicating that the part should be replaced before the target printer is rented to the target user.

* * * * *